United States Patent
Sasaki

(10) Patent No.: US 10,236,535 B2
(45) Date of Patent: Mar. 19, 2019

(54) BATTERY

(71) Applicant: Panasonic Intellectual Property Management Co., Ltd., Osaka (JP)

(72) Inventor: Izuru Sasaki, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 294 days.

(21) Appl. No.: 15/219,399

(22) Filed: Jul. 26, 2016

(65) Prior Publication Data

US 2017/0054181 A1 Feb. 23, 2017

(30) Foreign Application Priority Data

Aug. 18, 2015 (JP) .................. 2015-160740

(51) Int. Cl.
*H01M 10/0525* (2010.01)
*H01M 10/0562* (2010.01)
*H01M 10/0583* (2010.01)
*H01M 10/0587* (2010.01)

(52) U.S. Cl.
CPC ... *H01M 10/0587* (2013.01); *H01M 10/0525* (2013.01); *H01M 10/0562* (2013.01); *H01M 10/0583* (2013.01)

(58) Field of Classification Search
None
See application file for complete search history.

(56) References Cited

U.S. PATENT DOCUMENTS 5,498,489 A * 3/1996 Dasgupta ......... H01M 10/0413
429/152
6,423,447 B1 * 7/2002 Ohsaki ................ H01M 4/131
29/623.1

FOREIGN PATENT DOCUMENTS

JP 2002-093404 3/2002
JP 2012174582 A * 9/2012

OTHER PUBLICATIONS

Machine translation of JP2012-174582A (Year: 2012).*

* cited by examiner

*Primary Examiner* — Eric R Smith
(74) *Attorney, Agent, or Firm* — Greenblum & Bernstein, P.L.C.

(57) ABSTRACT

A battery includes a first portion and a second portion, in which the first portion includes a first positive electrode layer, a first negative electrode layer, and a first solid electrolyte layer located between the first positive electrode layer and the first negative electrode layer, in which the second portion includes a second positive electrode layer, a second negative electrode layer, and a second solid electrolyte layer located between the second positive electrode layer and the second negative electrode layer, in which the first portion and the second portion are in contact with each other, the second portion is more sharply bent than the first portion, and $C_{p1}<C_{p2}$, $C_{e1}<C_{e2}$, and $C_{n1}<C_{n2}$ are satisfied.

17 Claims, 24 Drawing Sheets

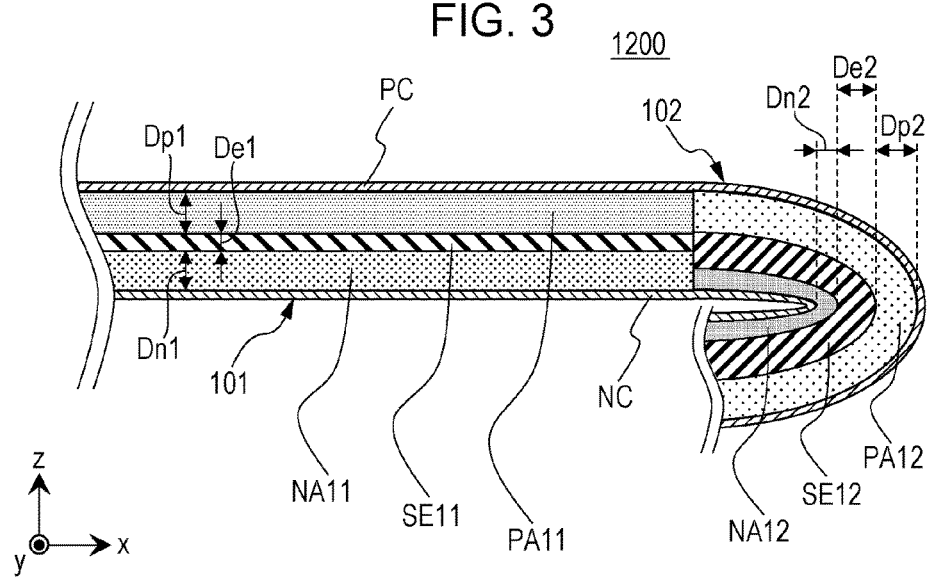
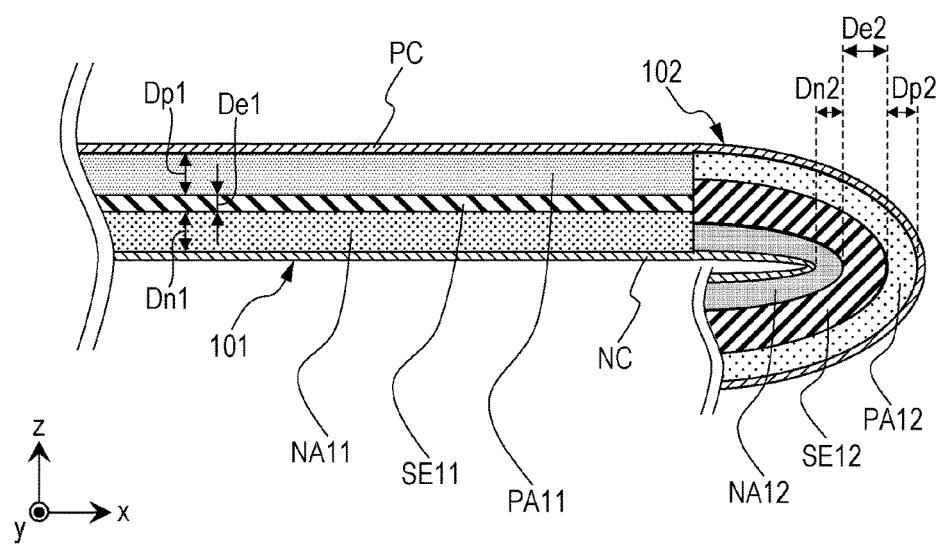

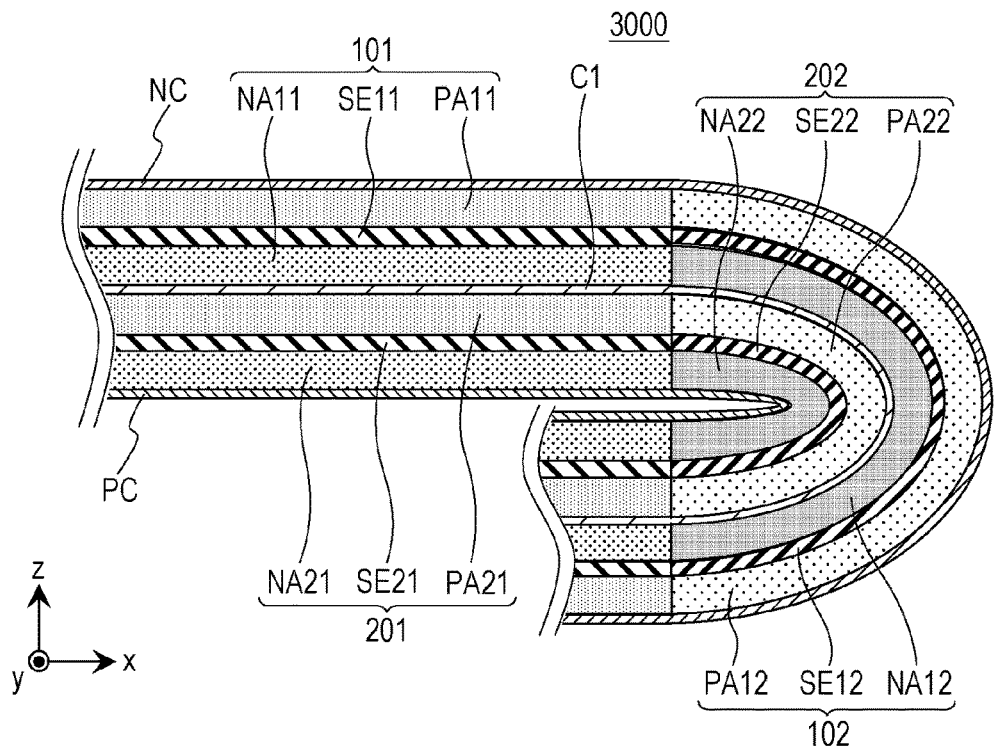
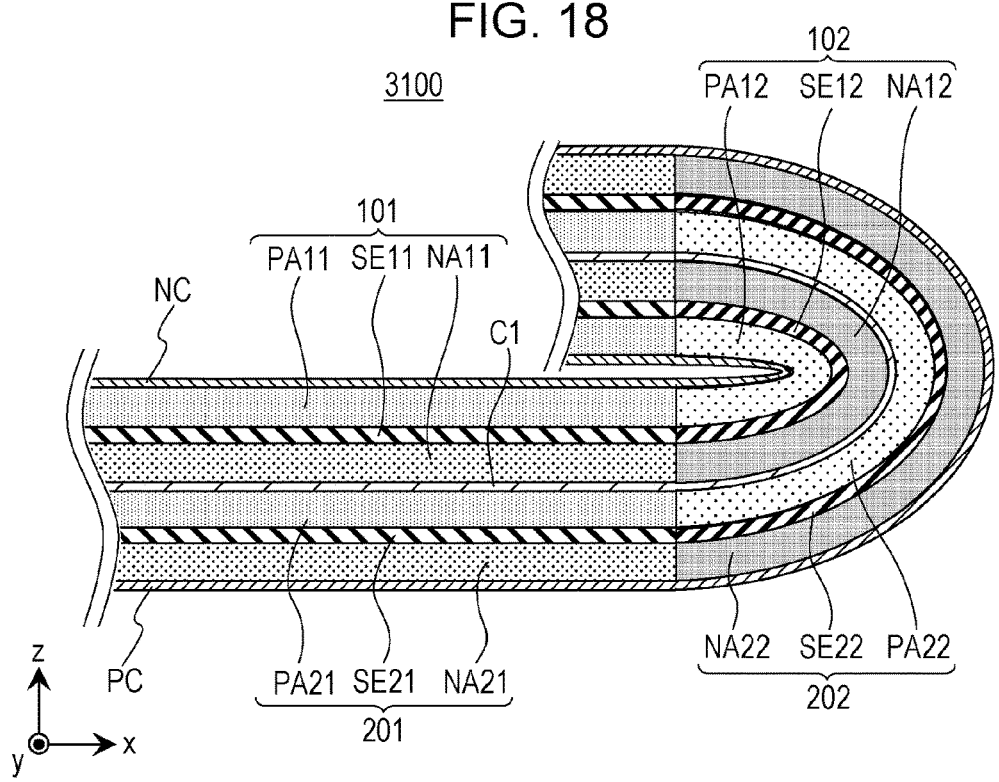

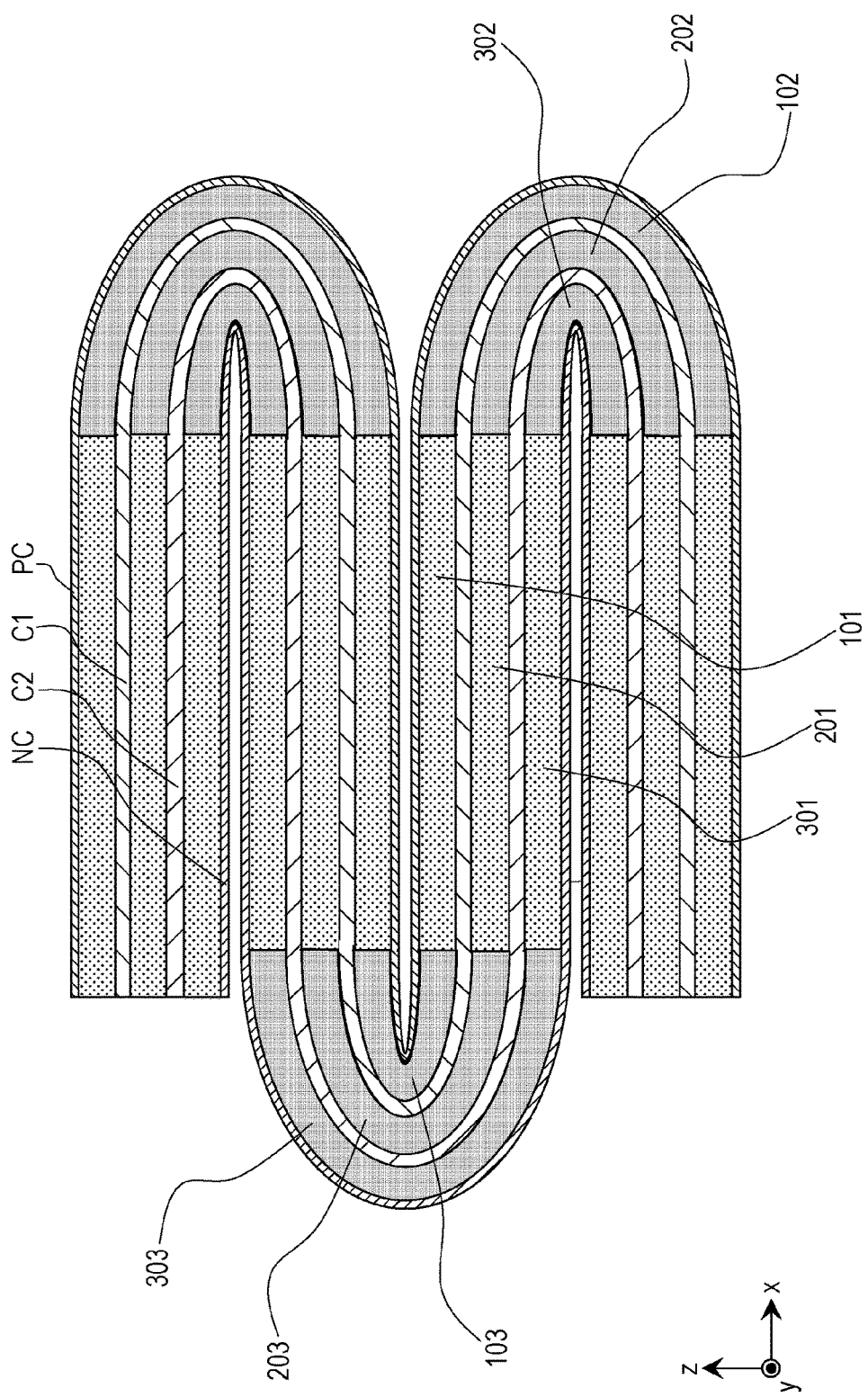

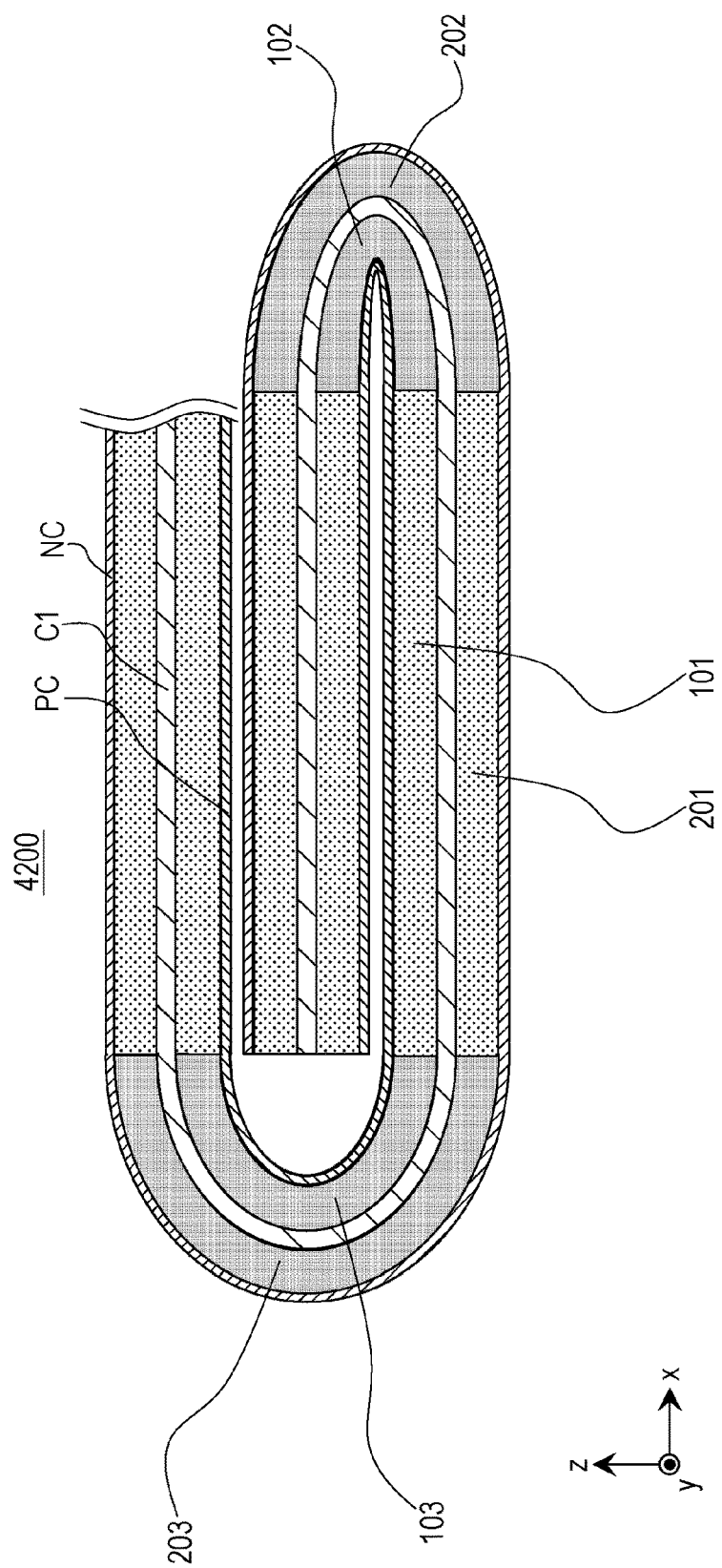

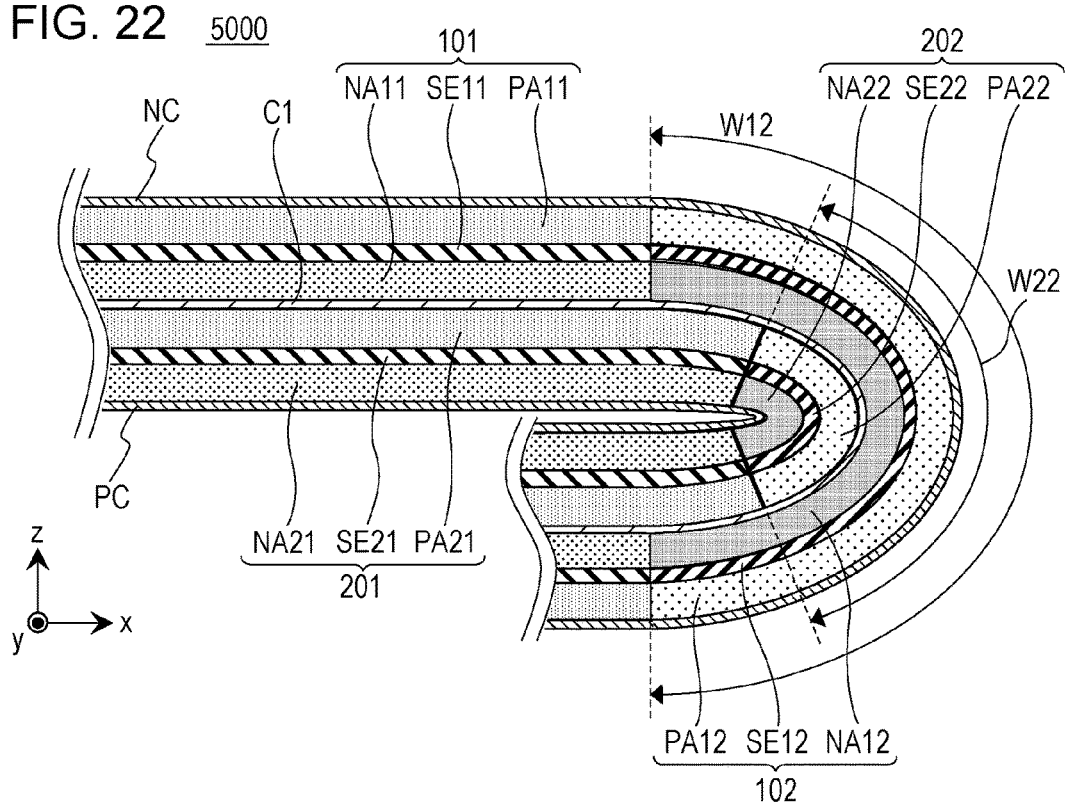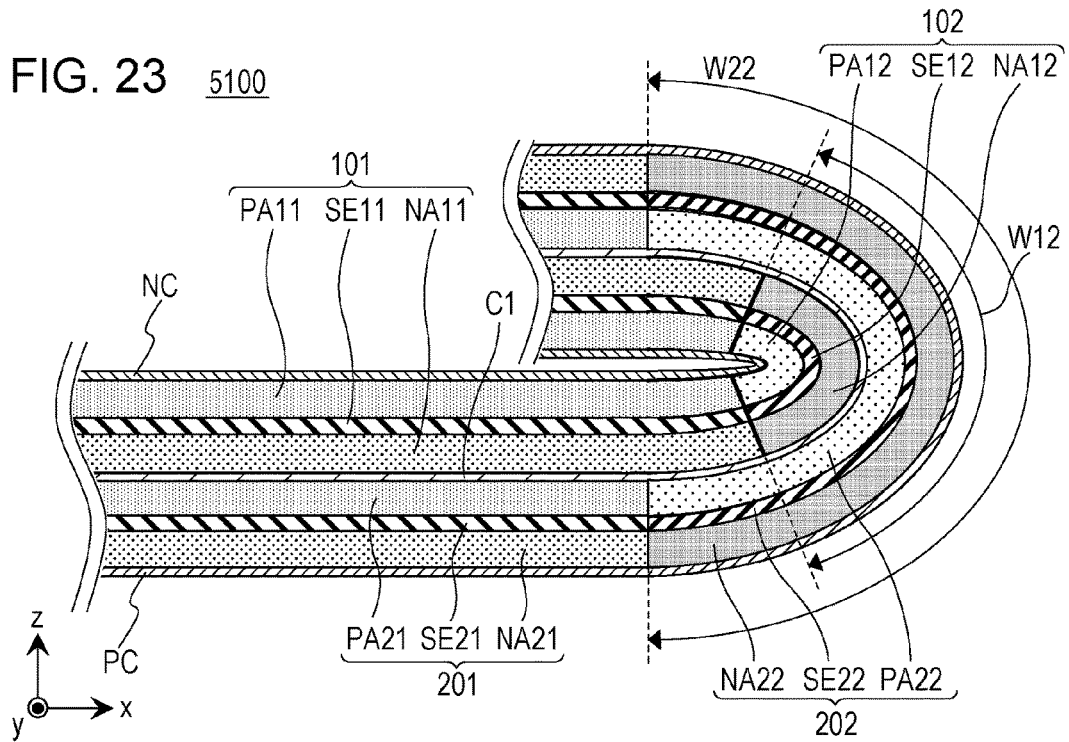

BATTERY

BACKGROUND

1. Technical Field

The present disclosure relates to a battery.

2. Description of the Related Art

Japanese Unexamined Patent Application Publication No. 2002-093404 discloses a lithium secondary battery including a laminate formed of a positive electrode, a separator, and a negative electrode, the laminate having a bend portion, a positive-electrode plate and a negative-electrode plate located at the bend portion each having an uncoated portion, and the uncoated portion being covered with an insulating tape.

SUMMARY

In the related art, a battery with high energy density has been required.

In one general aspect, the techniques disclosed here feature a battery including a first portion and a second portion, in which the first portion includes a first positive electrode layer, a first negative electrode layer, and a first solid electrolyte layer located between the first positive electrode layer and the first negative electrode layer, in which the second portion includes a second positive electrode layer, a second negative electrode layer, and a second solid electrolyte layer located between the second positive electrode layer and the second negative electrode layer, in which the first portion and the second portion are in contact with each other, the second portion is more sharply bent than the first portion, and $C_{p1}<C_{p2}$, $C_{e1}<C_{e2}$, and $C_{n1}<C_{n2}$ are satisfied, where $C_{p1}$ denotes a binder concentration in the first portion, $C_{p2}$ denotes a binder concentration in the second positive electrode layer, $C_{e1}$ denotes a binder concentration in the first solid electrolyte layer, $C_{e2}$ denotes a binder concentration in the second solid electrolyte layer, $C_{n1}$ denotes a binder concentration in the first negative electrode layer, and $C_{n2}$ denotes a binder concentration in the second negative electrode layer.

According to an embodiment of the present disclosure, a battery with high energy density is produced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a cross-sectional view illustrating the schematic structure of a battery according to a modification of the first embodiment;

FIG. 4 is a cross-sectional view illustrating the schematic structure of a battery according to a modification of the first embodiment;

FIG. 17 is a cross-sectional view of the schematic structure of a battery according to a third embodiment;

FIG. 18 is a cross-sectional view of the schematic structure of a battery according to a modification of the third embodiment;

FIG. 20 is a cross-sectional view of the schematic structure of a battery according to a modification of the fourth embodiment;

FIG. 21 is a cross-sectional view of the schematic structure of a battery according to a modification of the fourth embodiment;

FIG. 22 is a cross-sectional view of the schematic structure of a battery according to a fifth embodiment;

FIG. 23 is a cross-sectional view of the schematic structure of a battery according to a modification of the fifth embodiment;

DETAILED DESCRIPTION

Embodiments will be described below with reference to the attached drawings.

First Embodiment

Figure 1:
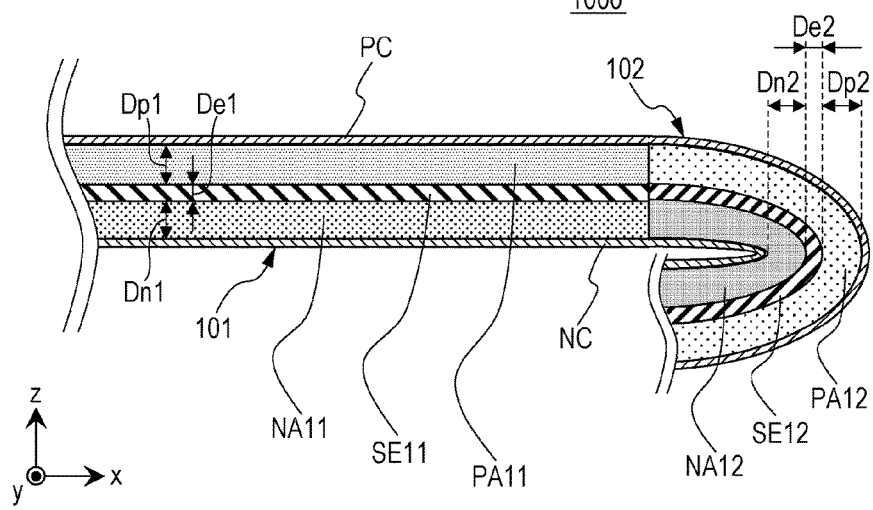
FIG. 1 is a cross-sectional view illustrating the schematic structure of a battery according to a first embodiment.

FIG. 1 is a cross-sectional view illustrating the schematic structure of a battery 1000 according to a first embodiment.

The battery 1000 according to the first embodiment includes a first portion 101 and a second portion 102.

The first portion 101 includes a first positive electrode layer PA11, a first negative electrode layer NA11, and a first solid electrolyte layer SE11.

The first solid electrolyte layer SE11 is located between the first positive electrode layer PA11 and the first negative electrode layer NA11.

The second portion 102 includes a second positive electrode layer PA12, a second negative electrode layer NA12, and a second solid electrolyte layer SE12.

The second solid electrolyte layer SE12 is located between the second positive electrode layer PA12 and the second negative electrode layer NA12.

The first portion 101 and the second portion 102 are in contact with each other.

The second portion 102 is more sharply bent than the first portion 101.

A binder concentration (% by weight) in the first positive electrode layer PA11 is denoted as $C_{p1}$. A binder concentration (% by weight) in the second positive electrode layer PA12 is denoted as $C_{p2}$. A binder concentration (% by weight) in the first solid electrolyte layer SE11 is denoted as $C_{e1}$. A binder concentration (% by weight) in the second solid electrolyte layer SE12 is denoted as $C_{e2}$. A binder concentration (% by weight) in the first negative electrode layer NA11 is denoted as $C_{n1}$. A binder concentration (% by weight) in the second negative electrode layer NA12 is denoted as $C_{n2}$.

In the battery 1000 according to the first embodiment, at least one of $C_{p1}<C_{p2}$, $C_{e1}<C_{e2}$, and $C_{n1}<C_{n2}$ is satisfied.

The foregoing structure results in a battery with high energy density.

For example, in a battery including an inorganic solid electrolyte, a binder is used in order to improve the binding properties of particles together or the binding properties of particles to a current collector.

For example, a positive electrode mixture layer (positive electrode layer) may contain a positive electrode active material, an inorganic solid electrolyte, and a binder. An inorganic solid electrolyte layer may contain the inorganic solid electrolyte and the binder. A negative electrode mixture layer (negative electrode layer) may contain a negative electrode active material, the inorganic solid electrolyte, and the binder.

The incorporation of the binder inhibits the separation of contact points between particles or between particles and a current collector attributed to, for example, strain or internal stresses due to a bend portion formed by the winding or bending of the battery. This results in an increase in the energy density of the battery.

The binder is an insulating substance that does not conduct a lithium ion or an electron. Thus, higher binder concentrations in the positive electrode mixture layer, the inorganic solid electrolyte layer, and the negative electrode mixture layer result in degradation in the charge-discharge characteristics of the battery, thereby reducing the energy density.

In a battery including a liquid electrolyte, for example, the liquid electrolyte is easily charged into small voids formed between a positive electrode active material in a positive electrode mixture layer and a binder, thereby forming a good interface between the active material and the electrolyte.

For example, in a battery including an inorganic solid electrolyte, it is difficult to charge the inorganic solid electrolyte into such small voids. Thus, a good interface between the active material and the electrolyte is not formed, thereby degrading the charge-discharge characteristics.

In contrast, in the structure according to the first embodiment, the second portion (for example, the bend portion) of the battery to which strain or internal stresses are applied has a high binder concentration. In the first portion (for example, a linear portion) has a low binder concentration.

In the case of the structure according to the first embodiment, thus, a reduction in energy density due to the binder is inhibited in the first portion (for example, the linear portion) while a reduction in energy density due to the strain or internal stresses is inhibited in the second portion (for example, the bend portion).

Thus, the battery has high energy density, compared with a structure in which both of the linear portion and the bend portion have high binder concentrations.

As disclosed in Japanese Unexamined Patent Application Publication No. 2002-093404, in a structure that does not include a mixture layer in a bend portion, strain or stress is not generated. However, electricity is not generated in the uncoated portion (that is, a bend portion without a mixture layer). Thus, the energy density of the battery is low.

In contrast, in the structure according to the first embodiment, the positive electrode layer, the negative electrode layer, and the solid electrolyte layer are arranged also in the second portion (for example, the bend portion).

Thus, the battery having the structure according to the first embodiment has high energy density, compared with a structure in which no mixture layer is arranged in the bend portion.

The first portion 101 may be arranged in the form of a line (plane).

The first portion 101 may be more gently bent than the second portion 102.

The first portion 101 may not be, for example, a bend portion of a battery with a winding or zigzag structure.

The second portion 102 may be, for example, a bend portion of a battery with a winding or zigzag structure.

The first portion 101 and the second portion 102 may have the same thickness.

The first portion 101 and the second portion 102 may have different thicknesses.

Examples of a material for the binder that may be used include polyvinylidene fluoride, polytetrafluoroethylene, polyethylene, polyacrylonitrile, polyhexafluoropropylene, styrene-butadiene rubber, and carboxymethyl cellulose.

All of the first positive electrode layer PA11, the second positive electrode layer PA12, the first solid electrolyte layer SE11, the second solid electrolyte layer SE12, the first negative electrode layer NA11, and the second negative electrode layer NA12 may contain the binder.

The first positive electrode layer PA11 may not contain any binder.

The first solid electrolyte layer SE11 may not contain any binder.

The first negative electrode layer NA11 may not contain any binder.

In the case where $C_{p1}<C_{p2}$ is satisfied in the battery 1000 according to the first embodiment, one or both of the second solid electrolyte layer SE12 and the second negative electrode layer NA12 may not contain any binder.

In the case where $C_{e1} < C_{e2}$ is satisfied in the battery 1000 according to the first embodiment, one or both of the second positive electrode layer PA12 and the second negative electrode layer NA12 may not contain any binder.

In the case where $C_{n1} < C_{n2}$ is satisfied in the battery 1000 according to the first embodiment, one or both of the second positive electrode layer PA12 and the second solid electrolyte layer SE12 may not contain any binder.

The binder in the first portion 101 may be composed of the same material as that of the binder in the second portion 102.

The binder in the first portion 101 may be composed of a material different from that of the binder in the second portion 102.

Each of the first solid electrolyte layer SE11 and the second solid electrolyte layer SE12 contains a solid electrolyte.

Examples of the solid electrolyte that may be used include inorganic solid electrolytes.

Examples of inorganic solid electrolytes that may be used include oxide solid electrolytes and sulfide solid electrolytes.

Examples of oxide solid electrolytes that may be used include NASICON-type solid electrolytes, typified by $LiTi_2(PO_4)_3$ and substitution products thereof; $(LaLi)TiO_3$-based perovskite-type solid electrolytes; LISICON-type solid electrolytes, typified by $Li_{14}ZnGe_4O_{16}$, $Li_4SiO_4$, $Li_4GeO_4$, and substitution products thereof; garnet-type solid electrolytes, typified by $Li_7La_3Zr_2O_{12}$ and substitution products thereof; $Li_3N$ and H-substituted products thereof; and $Li_3PO_4$ and N-substituted products thereof.

Examples of sulfide solid electrolytes that may be used include $Li_2S$—$P_2S5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. These sulfide solid electrolytes may further contain, for example, LiX (where X denotes F, Cl, Br, or I), $MO_y$, or $Li_xMO_y$ (where M denotes any one of P, Si, Ge, B, Al, Ga, and In; and x and y each denote a natural number). $Li_2S$—$P_2S_5$ has high ionic conductivity, is less likely to be reduced at a low potential, and has low particle hardness. Thus, the use of $Li_2S$—$P_2S_5$ facilitates the formation of a battery and results in a battery with high energy density.

Each of the first solid electrolyte layer SE11 and the second solid electrolyte layer SE12 may have a thickness of 1 to 100 μm. A thickness of the solid electrolyte layer less than 1 μm results in an increase in the possibility of a short circuit between the positive electrode layer and the negative electrode layer. A thickness of the solid electrolyte layer more than 100 μm can make it difficult to operate a battery at a high output power.

The solid electrolyte in the first solid electrolyte layer SE11 and the solid electrolyte in the second solid electrolyte layer SE12 may be composed of the same material and may have the same structure.

Alternatively, the solid electrolyte in the first solid electrolyte layer SE11 and the solid electrolytes in the second solid electrolyte layer SE12 may be composed of different materials from each other or may have different structures from each other.

The first solid electrolyte layer SE11 and the second solid electrolyte layer SE12 may be in contact with each other.

Each of the first positive electrode layer PA11 and the second positive electrode layer PA12 may contain a positive electrode active material.

Each of the first positive electrode layer PA11 and the second positive electrode layer PA12 may be a positive electrode mixture layer containing the positive electrode active material and the solid electrolyte.

The positive electrode active material may be, for example, a material that occludes and releases metal ions. The positive electrode active material may be, for example, a material that occludes and releases lithium ions. Examples of the positive electrode active material that may be used include lithium-containing transition metal oxides, transition metal fluorides, polyanion and fluorinated polyanion materials, and transition metal sulfide. The use of a lithium ion-containing transition metal oxide reduces the production cost and increases the average discharge voltage.

The positive electrode mixture layer may have a thickness of 10 to 500 μm. A thickness of the positive electrode mixture layer less than 10 μm can make it difficult to sufficiently ensure the energy density of the battery. A thickness of the positive electrode mixture layer more than 500 μm can make it difficult to operate the battery at a high output power.

The positive electrode active material in the first positive electrode layer PA11 and the positive electrode active material in the second positive electrode layer PA12 may be composed of the same material and may have the same structure.

Alternatively, the positive electrode active material in the first positive electrode layer PA11 and the positive electrode active material in the second positive electrode layer PA12 may be composed of different materials from each other and may have different structures from each other.

The first positive electrode layer PA11 and the second positive electrode layer PA12 may be in contact with each other.

Each of the first negative electrode layer NA11 and the second negative electrode layer NA12 contains a negative electrode active material.

Each of the first negative electrode layer NA11 and the second negative electrode layer NA12 may be a negative electrode mixture layer containing the negative electrode active material and the solid electrolyte.

The negative electrode active material may be, for example, a material that occludes and releases metal ions. The negative electrode active material may be, for example, a material that occludes and releases lithium ions. Examples of the negative electrode active material that may be used include metallic lithium, metals and alloys reactive with lithium to form alloys, carbon, transition metal oxides, and transition metal sulfides. Examples of carbon that may be used include graphite and non-graphite-based carbon materials, such as hard carbon and coke. Examples of transition metal oxides that may be used include CuO and NiO. Examples of transition metal sulfides that may be used include copper sulfide denoted as CuS. As metals and alloys reactive with lithium to form alloys, for example, alloys of lithium and silicon compounds, tin compounds, or aluminum compounds may be used. The use of carbon reduces the production cost and increases the average discharge voltage.

The negative electrode mixture layer may have a thickness of 10 to 500 μm. A thickness of the negative electrode mixture layer less than 10 μm can make it difficult to sufficiently ensure the energy density of the battery. A thickness of the negative electrode mixture layer more than 500 μm can make it difficult to operate the battery at a high output power.

The negative electrode active material in the first negative electrode layer NA11 and the negative electrode active material in the second negative electrode layer NA12 may be composed of the same material and may have the same structure.

Alternatively, the negative electrode active material in the first negative electrode layer NA11 and the negative electrode active material in the second negative electrode layer NA12 may be composed of different materials from each other and may have different structures from each other.

The first negative electrode layer NA11 and the second negative electrode layer NA12 may be in contact with each other.

The battery 1000 illustrated in FIG. 1 includes a positive electrode current collector PC.

The positive electrode current collector PC is in contact with the first positive electrode layer PA11 and the second positive electrode layer PA12.

Examples of the positive electrode current collector that may be used include porous and nonporous sheets and films composed of metal materials, such as aluminum, stainless steel, titanium, and alloys thereof. Aluminum and alloys thereof are inexpensive and are easily formed into thin films. The sheets and the films may be formed of metal foil or meshes.

The positive electrode current collector may have a thickness of 1 to 30 μm. A thickness of the positive electrode current collector less than 1 μm leads to insufficient mechanical strength, thereby easily causing the cracking or breaking of the current collector. A thickness of the positive electrode current collector more than 30 μm can result in a reduction in the energy density of the battery.

The positive electrode current collector PC may be provided with a positive electrode terminal.

The battery 1000 illustrated in FIG. 1 includes a negative electrode current collector NC.

The negative electrode current collector NC is in contact with the first negative electrode layer NA11 and the second negative electrode layer NA12.

Examples of the negative electrode current collector that may be used include porous and nonporous sheets and films composed of metal materials, such as stainless steel, nickel, copper, and alloys thereof. Copper and alloys thereof are inexpensive and are easily formed into thin films. The sheets and the films may be formed of metal foil or meshes.

The negative electrode current collector may have a thickness of 1 to 30 μm. A thickness of the negative electrode current collector less than 1 μm leads to insufficient mechanical strength, thereby easily causing the cracking or breaking of the current collector. A thickness of the negative electrode current collector more than 30 μm can result in a reduction in the energy density of the battery.

The negative electrode current collector NC may be provided with a negative electrode terminal.

Each of the positive electrode mixture layer and the negative electrode mixture layer may contain a conductive assistant in order to reduce the electrode resistance.

Examples of the conductive assistant that may be used include graphites, such as natural graphite and artificial graphite, carbon blacks, such as acetylene black and Ketjenblack, conductive fibers, such as carbon fibers and metal fibers, carbon fluorides, powders of metals, such as aluminum, conductive whiskers of, for example, zinc oxide and potassium titanate, conductive metal oxides, such as titanium oxide, and conductive polymers, such as polyaniline, polypyrrole, and polythiophene. The use of the carbon conductive assistant reduces costs.

In the battery 1000 according to the first embodiment, $C_{p1}<C_{p2}$, $C_{e1}<C_{e2}$, and $C_{n1}<C_{n2}$ may all be satisfied.

The foregoing structure results in further inhibition of a reduction in energy density due to the binder in the first portion (for example, the linear portion), thereby resulting in the battery with higher energy density. More specifically, in all of the positive electrode layer, the solid electrolyte layer, and the negative electrode layer, the reduction in energy density due to the binder in the first portion (for example, the linear portion) is inhibited while a reduction in energy density due to strain or internal stresses in the second portion (for example, the bend portion) is inhibited, thereby resulting in the battery with higher energy density. For example, in comparison with a structure in which both of the linear portion and the bend portion in any of the positive electrode layer, the solid electrolyte layer, and the negative electrode layer have a uniformly high binder concentration, the battery has high energy density. For example, in comparison with a structure in which only $C_{p1}<C_{p2}$ is satisfied, the battery has high energy density. For example, in comparison with a structure in which only $C_{e1}<C_{e2}$ is satisfied, the battery has high energy density. For example, in comparison with a structure in which only $C_{n1}<C_{n2}$ is satisfied, the battery has high energy density.

As the negative electrode active material in the negative electrode layer, an active material having lower particle hardness than that of the positive electrode active material in the positive electrode layer may be used.

In the case of using the active material having low particle hardness, the generation of strain or internal stresses is reduced, compared with the case of using an active material having high particle hardness. Thus, the use of the active material having low particle hardness inhibits the separation of contact points between particles or between particles and a current collector even at a low binder concentration.

In this case, in the battery 1000 according to the first embodiment, $C_{p2}>C_{n2}$ may be satisfied.

The foregoing structure results in a reduction in the amount of the binder while the effect of the binder in the negative electrode layer is maintained. This further inhibits the reduction in energy density due to the binder, thereby resulting in the battery with higher energy density.

The thickness $D_{p1}$ of the first positive electrode layer PA11 and the thickness $D_{p2}$ of the second positive electrode layer PA12 may be equal to each other.

The thickness $D_{e1}$ of the first solid electrolyte layer SE11 and the thickness $D_{e2}$ of the second solid electrolyte layer SE12 may be equal to each other.

The thickness $D_{n1}$ of the first negative electrode layer NA11 and the thickness $D_{n2}$ of the second negative electrode layer NA12 may be equal to each other.

The thicknesses of the layers in the first portion 101 may be different from those of the layers in the second portion 102.

Figure 2:
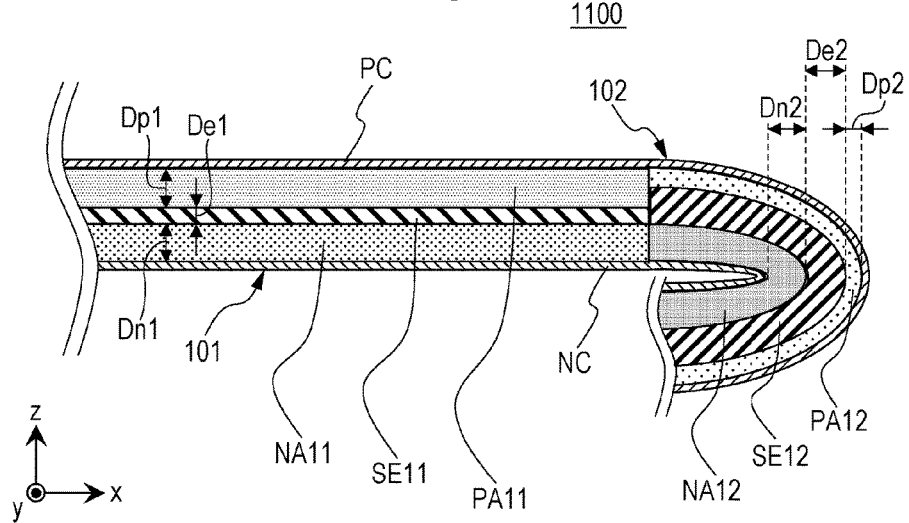
FIG. 2 is a cross-sectional view illustrating the schematic structure of a battery according to a modification of the first embodiment.

FIG. 2 is a cross-sectional view illustrating the schematic structure of a battery 1100 according to a modification of the first embodiment.

In the battery 1100 illustrated in FIG. 2, $D_{p1}>D_{p2}$ is satisfied.

In the foregoing structure, the positive electrode layer in the second portion (for example, the bend portion) is thinner than the positive electrode layer in the first portion (for example, the linear portion), so that strain or internal stresses generated in the second portion (for example, the bend portion) are further reduced. This further inhibits degradation in charge-discharge characteristics due to strain or internal stresses, thereby resulting in the battery with higher energy density.

FIG. 3 is a cross-sectional view illustrating the schematic structure of a battery 1200 according to a modification of the first embodiment.

In the battery 1200 illustrated in FIG. 3, $D_{n1} > D_{n2}$ is satisfied.

In the foregoing structure, the negative electrode layer in the second portion (for example, the bend portion) is thinner than the negative electrode layer in the first portion (for example, the linear portion), so that strain or internal stresses generated in the second portion (for example, the bend portion) are further reduced. This further inhibits degradation in charge-discharge characteristics due to strain or internal stresses, thereby resulting in the battery with higher energy density.

FIG. 4 is a cross-sectional view illustrating the schematic structure of a battery 1300 according to a modification of the first embodiment.

Figure 5:
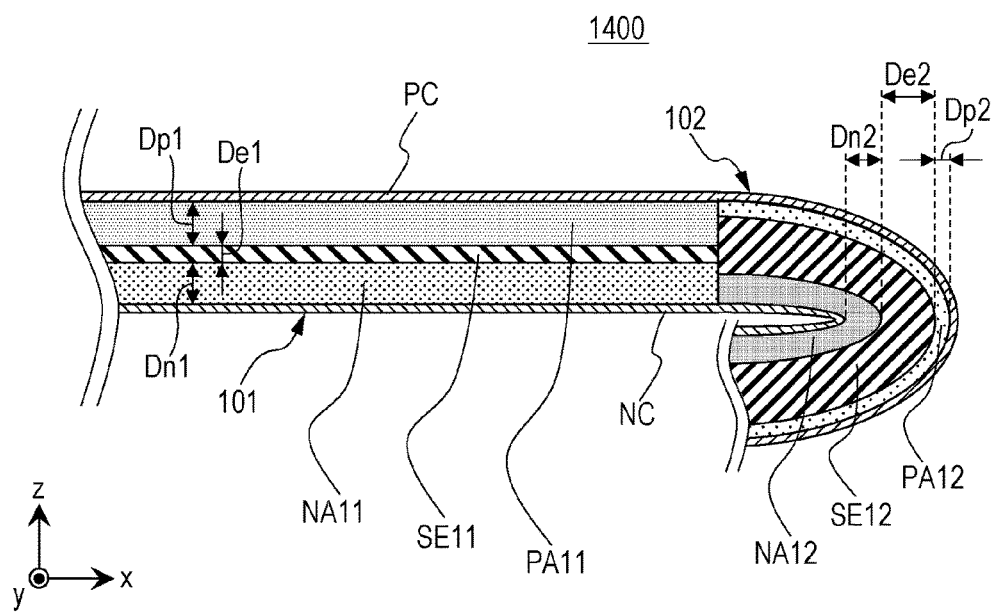
FIG. 5 is a cross-sectional view illustrating the schematic structure of a battery according to a modification of the first embodiment.

FIG. 5 is a cross-sectional view illustrating the schematic structure of a battery 1400 according to a modification of the first embodiment.

In each of the battery 1300 illustrated in FIG. 4 and the battery 1400 illustrated in FIG. 5, $D_{n1} > D_{n2}$, and $D_{p1} > D_{p2}$ are satisfied.

In the foregoing structures, all the effects provided by the structures of the batteries 1100 and 1200 are achieved, thereby resulting in the batteries with higher energy density.

In the case where an active material having higher particle hardness than that of the negative electrode active material in the negative electrode layer is used as the positive electrode active material in the positive electrode layer, strain or internal stresses are easily generated in the second portion (for example, the bend portion).

Thus, $D_{p2} < D_{n2}$ may be satisfied, like the battery 1100 illustrated in FIG. 2 or the battery 1400 illustrated in FIG. 5.

In the foregoing structure, strain or internal stresses generated in the positive electrode layer are further reduced. This further inhibits degradation in charge-discharge characteristics due to strain or internal stresses, thereby resulting in the battery with higher energy density.

As illustrated in FIGS. 1 to 5, the second portion 102 may be bent toward a side on which the first negative electrode layer NA11 lies.

Alternatively, the second portion 102 may be bent toward a side on which the first positive electrode layer PA11 lies. This structure also provides the effects described above.

Second Embodiment

A second embodiment will be described below. The same descriptions as in the first embodiment are not redundantly repeated.

Figure 6:
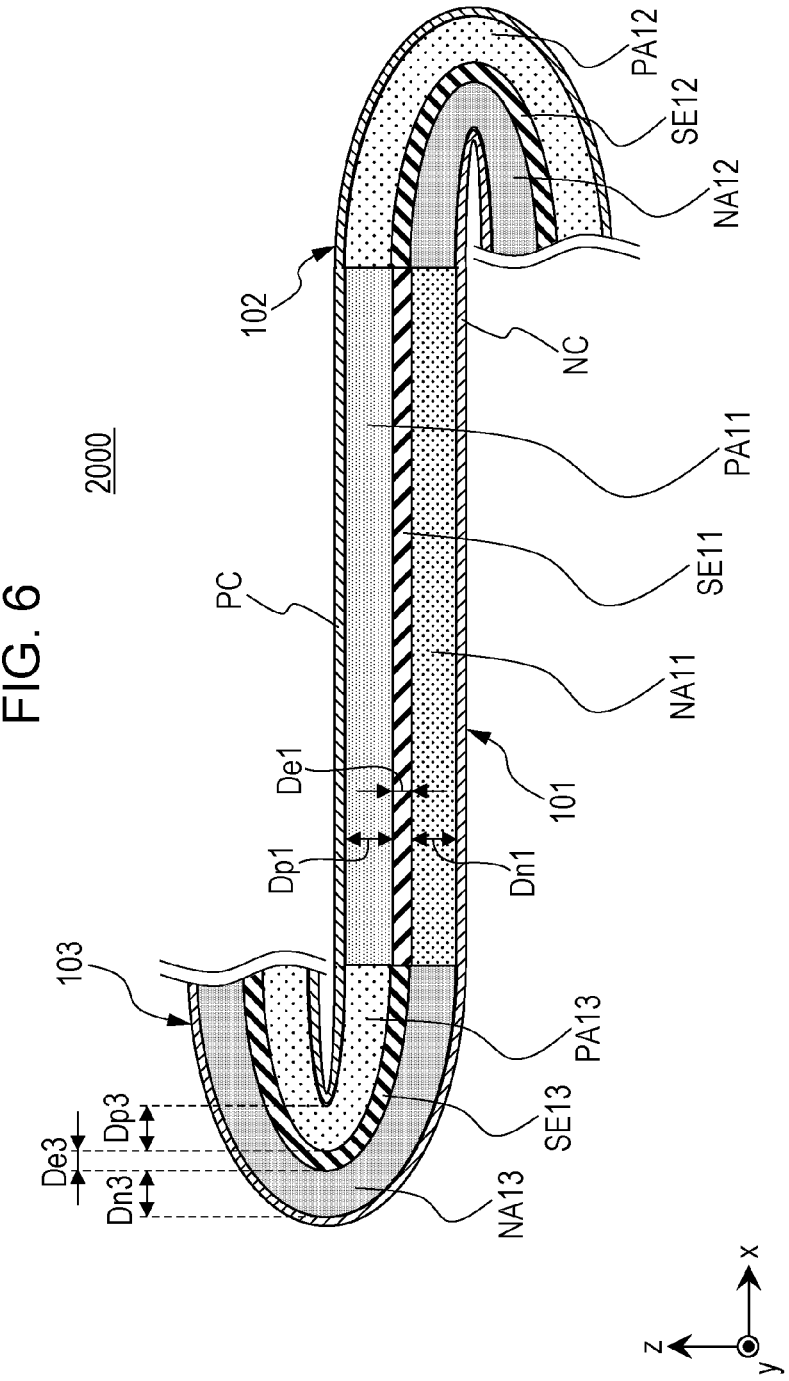
FIG. 6 is a cross-sectional view illustrating the schematic structure of a battery according to a second embodiment.

FIG. 6 is a cross-sectional view illustrating the schematic structure of a battery 2000 according to the second embodiment.

The battery 2000 according to the second embodiment has the following structure in addition to the structure described in the first embodiment.

The battery 2000 according to the second embodiment includes a third portion 103.

The third portion 103 includes a third positive electrode layer PA13, a third negative electrode layer NA13, and a third solid electrolyte layer SE13 located between the third positive electrode layer PA13 and the third negative electrode layer NA13.

The first portion 101 and the third portion 103 are in contact with each other.

The third portion 103 is more sharply bent than the first portion 101.

A binder concentration in the third positive electrode layer is denoted as $C_{p3}$ (% by weight). A binder concentration in the third solid electrolyte layer is denoted as $C_{e3}$ (% by weight). A binder concentration in the third negative electrode layer is denoted as $C_{n3}$ (% by weight).

At least one of $C_{p1} < C_{p3}$, $C_{e1} < C_{e3}$, and $C_{n1} < C_{n3}$ is satisfied.

In the case of the foregoing structure, a reduction in energy density due to the binder in the first portion (for example, the linear portion) is inhibited while a reduction in energy density due to strain or internal stresses in the third portion (for example, a bend portion) is inhibited, thereby resulting in the battery with higher energy density.

The third portion 103 may be, for example, a bend portion of a battery with a winding or zigzag structure.

The third portion 103 may be more gently bent than the second portion 102.

The third portion 103 may be more sharply bent than the second portion 102.

The third portion 103 may be bent to the same degree as the second portion 102.

The third portion 103 and the first portion 101 may have the same thickness.

The third portion 103 and the first portion 101 may have different thicknesses.

The third portion 103 and the second portion 102 may have the same thickness.

The third portion 103 and the second portion 102 may have different thicknesses.

The binder described in the first embodiment may be used as a binder contained in the third portion 103.

Each of the third positive electrode layer PA13, the third solid electrolyte layer SE13, and the third negative electrode layer NA13 may contain the binder.

In the case where $C_{p1} < C_{p3}$ is satisfied in the battery 2000 according to the second embodiment, one or both of the third solid electrolyte layer SE13 and the third negative electrode layer NA13 may not contain any binder.

In the case where $C_{e1} < C_{e3}$ is satisfied in the battery 2000 according to the second embodiment, one or both of the third positive electrode layer PA13 and the third negative electrode layer NA13 may not contain any binder.

In the case where $C_{n1} < C_{n3}$ is satisfied in the battery 2000 according to the second embodiment, one or both of the third positive electrode layer PA13 and the third solid electrolyte layer SE13 may not contain any binder.

The binder in the third portion 103 may be composed of the same material as that of the binder in the first portion 101.

The binder in the third portion 103 may be composed of a material different from that of the binder in the first portion 101.

The third solid electrolyte layer SE13 contains a solid electrolyte.

As this solid electrolyte, the solid electrolyte described in the first embodiment may be used.

The solid electrolyte in the third solid electrolyte layer SE13 and the solid electrolyte in the first solid electrolyte layer SE11 or the second solid electrolyte layer SE12 may be composed of the same material and may have the same structure.

Alternatively, the solid electrolyte in the third solid electrolyte layer SE13 and the solid electrolyte in the first solid electrolyte layer SE11 or the second solid electrolyte layer SE12 may be composed of different materials from each other or may have different structures from each other.

The third solid electrolyte layer SE13 and the first solid electrolyte layer SE11 may be in contact with each other.

The third positive electrode layer PA13 contains a positive electrode active material.

As this positive electrode active material, the positive electrode active material described in the first embodiment may be used.

The third positive electrode layer PA13 may be a positive electrode mixture layer containing the positive electrode active material and the solid electrolyte.

The positive electrode active material in the third positive electrode layer PA13 and the positive electrode active material in the first positive electrode layer PA11 or the second positive electrode layer PA12 may be composed of the same material and may have the same structure.

Alternatively, the positive electrode active material in the third positive electrode layer PA13 and the positive electrode active material in the first positive electrode layer PA11 or the second positive electrode layer PA12 may be composed of different materials from each other and may have different structures from each other.

The third positive electrode layer PA13 and the first positive electrode layer PA11 may be in contact with each other.

The third negative electrode layer NA13 contains a negative electrode active material.

As this negative electrode active material, the foregoing negative electrode active material described in the first embodiment may be used.

The third negative electrode layer NA13 may be a negative electrode mixture layer containing the negative electrode active material and the solid electrolyte.

The negative electrode active material in the third negative electrode layer NA13 and the negative electrode active material in the first negative electrode layer NA11 or the second negative electrode layer NA12 may be composed of the same material and may have the same structure.

Alternatively, the negative electrode active material in the third negative electrode layer NA13 and the negative electrode active material in the first negative electrode layer NA11 or the second negative electrode layer NA12 may be composed of different materials from each other and may have different structures from each other.

The third negative electrode layer NA13 and the first negative electrode layer NA11 may be in contact with each other.

The third positive electrode layer PA13 is in contact with the positive electrode current collector PC.

The third negative electrode layer NA13 is in contact with the negative electrode current collector NC.

In the battery 2000 according to the second embodiment, $C_{p1}<C_{p3}$, $C_{e1}<C_{e3}$, and $C_{n1}<C_{n3}$ may all be satisfied.

The foregoing structure results in further inhibition of a reduction in energy density due to the binder in the first portion (for example, the linear portion), thereby resulting in the battery with higher energy density. More specifically, in all of the positive electrode layer, the solid electrolyte layer, and the negative electrode layer, the reduction in energy density due to the binder in the first portion (for example, the linear portion) is inhibited while a reduction in energy density due to strain or internal stresses in the third portion (for example, the bend portion) is inhibited, thereby resulting in the battery with higher energy density. For example, in comparison with a structure in which both of the linear portion and the bend portion in any of the positive electrode layer, the solid electrolyte layer, and the negative electrode layer have a uniformly high binder concentration, the battery has high energy density. For example, in comparison with a structure in which only $C_{p1}<C_{p3}$ is satisfied, the battery has high energy density. For example, in comparison with a structure in which only $C_{e1}<C_{e3}$ is satisfied, the battery has high energy density. For example, in comparison with a structure in which only $C_{n1}<C_{n3}$ is satisfied, the battery has high energy density.

As the negative electrode active material in the third negative electrode layer NA13, an active material having lower particle hardness than that of the positive electrode active material in the third positive electrode layer PA13 may be used.

In this case, in the battery 2000 according to the second embodiment, $C_{p3}>C_{n3}$ may be satisfied.

The foregoing structure results in a reduction in the amount of the binder while the effect of the binder in the negative electrode layer is maintained. This further inhibits the reduction in energy density due to the binder, thereby resulting in the battery with higher energy density.

The thickness $D_{p3}$ of the third positive electrode layer PA13 may be equal to the thickness $D_{p1}$ of the first positive electrode layer PA11 or the thickness $D_{p2}$ of the second positive electrode layer PA12.

The thickness $D_{e3}$ of the third solid electrolyte layer SE13 may be equal to the thickness of $D_{e1}$ of the first solid electrolyte layer SE11 or the thickness of $D_{e2}$ of the second solid electrolyte layer SE12.

The thickness $D_{n3}$ of the third negative electrode layer NA13 may be equal to the thickness $D_{n1}$ of the first negative electrode layer NA11 or the thickness $D_{n2}$ of the second negative electrode layer NA12.

The thicknesses of the layers in the third portion 103 may be different from those of the layers in the first portion 101 or the second portion 102.

Figure 7:
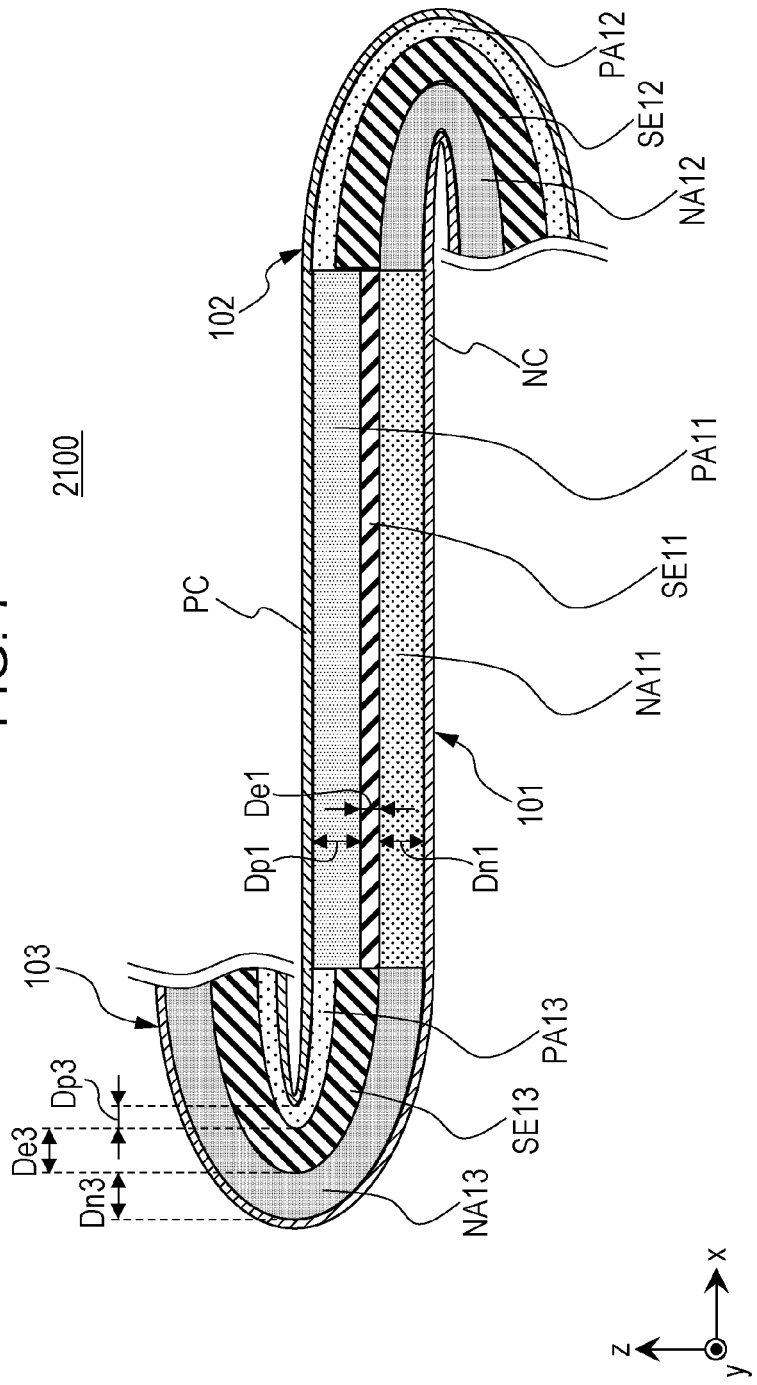
FIG. 7 is a cross-sectional view illustrating the schematic structure of a battery according to a modification of the second embodiment.

FIG. 7 is a cross-sectional view illustrating the schematic structure of a battery 2100 according to a modification of the second embodiment.

In the battery 2100 illustrated in FIG. 7, $D_{p1}>D_{p3}$ is satisfied.

In the foregoing structure, the positive electrode layer in the third portion (for example, the bend portion) is thinner than the positive electrode layer in the first portion (for example, the linear portion), so that strain or internal stresses generated in the third portion (for example, the bend portion) are further reduced. This further inhibits degradation in charge-discharge characteristics due to strain or internal stresses, thereby resulting in the battery with higher energy density.

Figure 8:
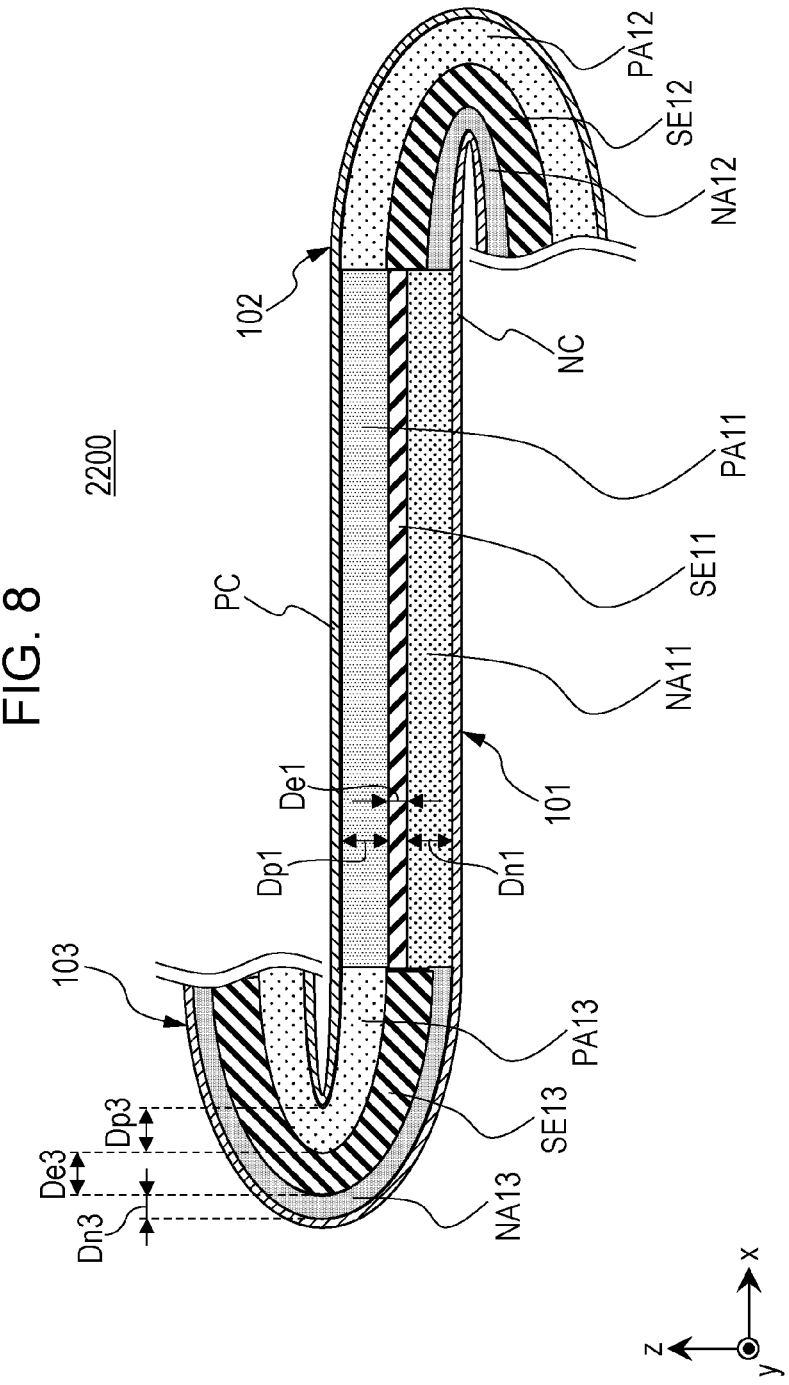
FIG. 8 is a cross-sectional view illustrating the schematic structure of a battery according to a modification of the second embodiment.

FIG. 8 is a cross-sectional view illustrating the schematic structure of a battery 2200 according to a modification of the second embodiment.

In the battery 2200 illustrated in FIG. 8, $D_{n1}>D_{n3}$ is satisfied.

In the foregoing structure, the negative electrode layer in the third portion (for example, the bend portion) is thinner than the negative electrode layer in the first portion (for example, the linear portion), so that strain or internal stresses generated in the third portion (for example, the bend portion) are further reduced. This further inhibits degradation in charge-discharge characteristics due to strain or internal stresses, thereby resulting in the battery with higher energy density.

Figure 9:
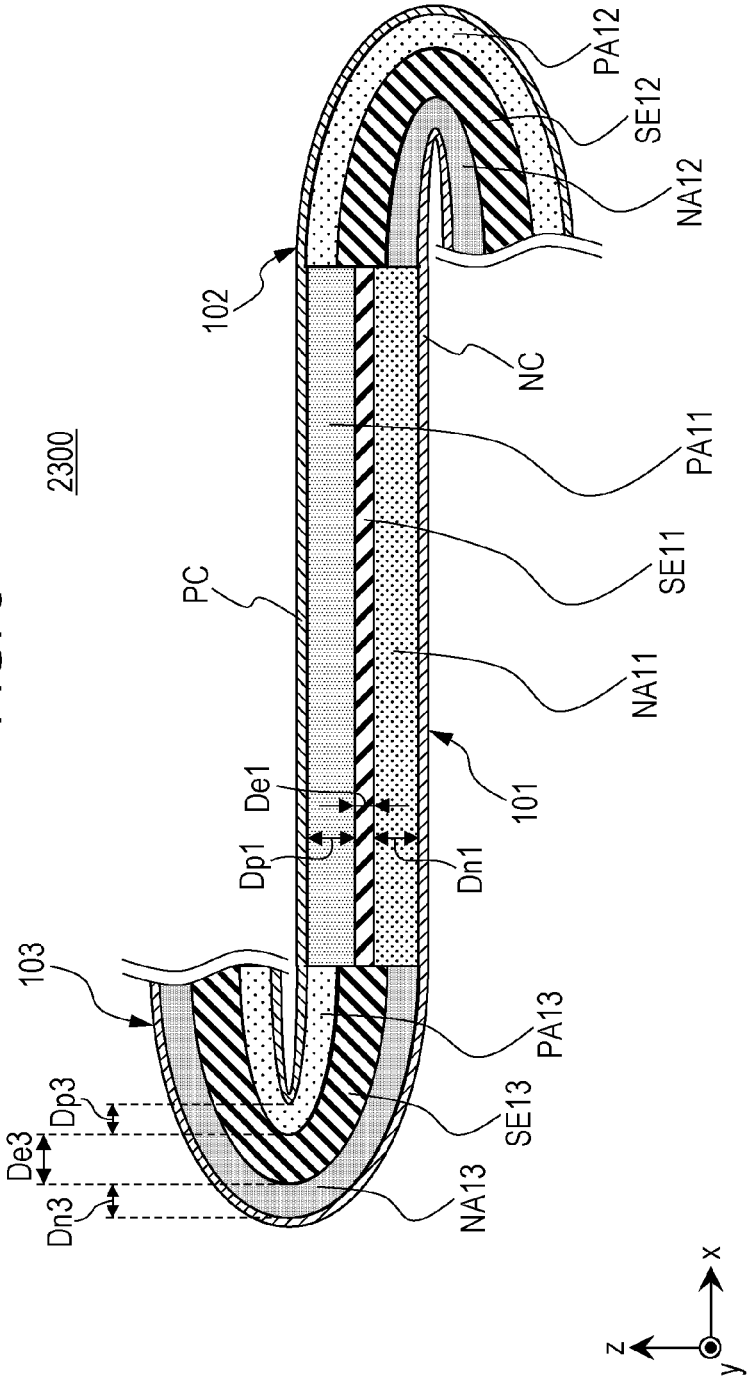
FIG. 9 is a cross-sectional view illustrating the schematic structure of a battery according to a modification of the second embodiment.

FIG. 9 is a cross-sectional view illustrating the schematic structure of a battery 2300 according to a modification of the second embodiment.

Figure 10:
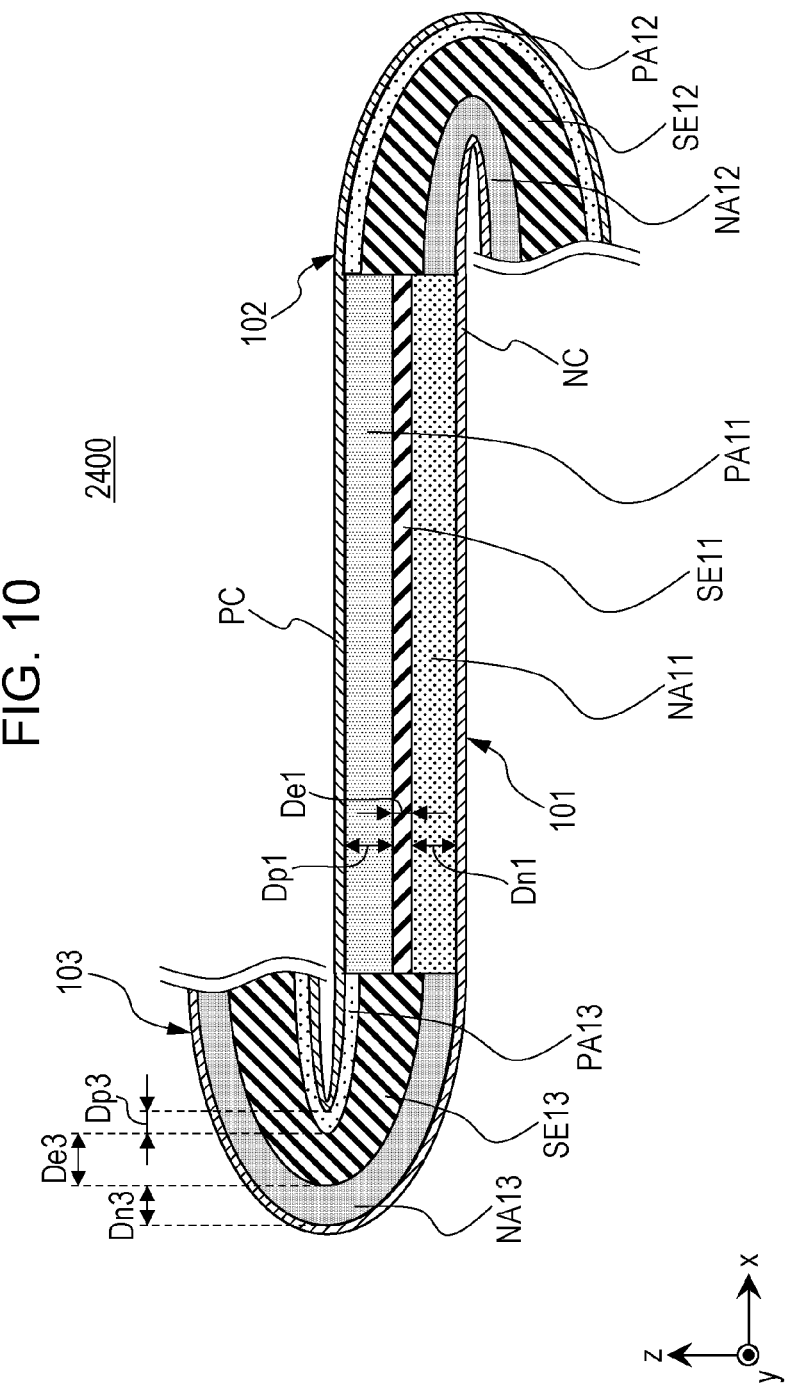
FIG. 10 is a cross-sectional view illustrating the schematic structure of a battery according to a modification of the second embodiment.

FIG. 10 is a cross-sectional view illustrating the schematic structure of a battery 2400 according to a modification of the second embodiment.

In each of the battery 2300 illustrated in FIG. 9 and the battery 2400 illustrated in FIG. 10, $D_{n1}>D_{n3}$, and $D_{p1}>D_{p3}$ are satisfied.

In the foregoing structures, all the effects provided by the structures of the batteries 2100 and 2200 are achieved, thereby resulting in the batteries with higher energy density.

In the case where an active material having higher particle hardness than that of the negative electrode active material in the third negative electrode layer NA13 is used as the positive electrode active material in the third positive electrode layer PA13, strain or internal stresses are easily generated in the third portion (for example, the bend portion).

Thus, $D_{p3}<D_{n3}$ may be satisfied, like the battery 2100 illustrated in FIG. 7 or the battery 2400 illustrated in FIG. 10.

In the foregoing structure, strain or internal stresses generated in the positive electrode layer are further reduced. This further inhibits degradation in charge-discharge characteristics due to strain or internal stresses, thereby resulting in the battery with higher energy density.

As illustrated in FIGS. 6 to 10, the third portion 103 may be bent toward a side on which the first positive electrode layer PA11 lies.

Alternatively, the third portion 103 may be bent toward a side on which the first negative electrode layer NA11 lies. This structure also provides the effects described above.

Figure 11:
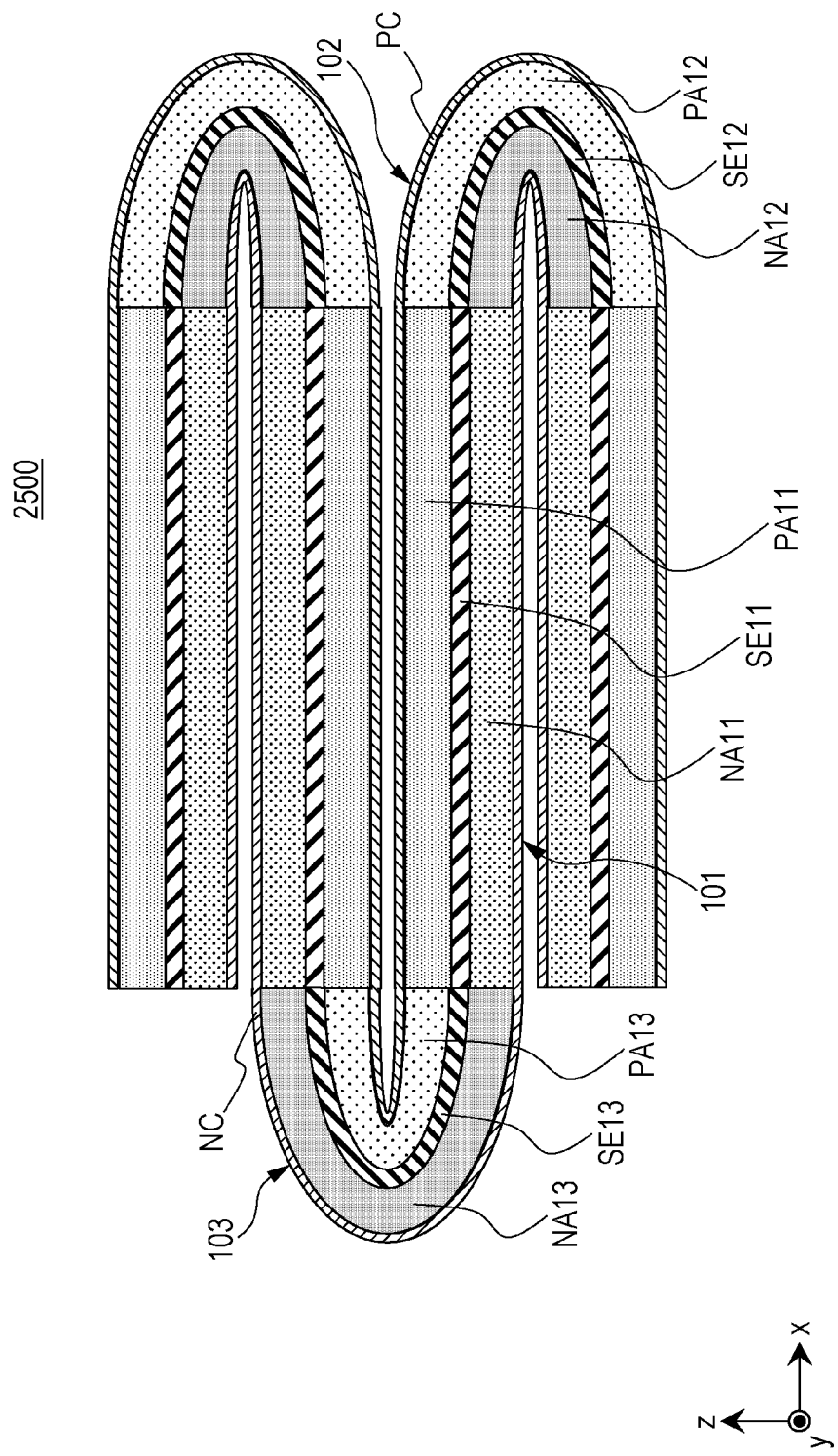
FIG. 11 is a cross-sectional view illustrating the schematic structure of a battery according to a modification of the second embodiment.

FIG. 11 is a cross-sectional view illustrating the schematic structure of a battery 2500 according to a modification of the second embodiment.

The battery 2500 illustrated in FIG. 11 is an example of a battery having a zigzag structure.

The battery 2500 illustrated in FIG. 11 includes four linear portions and three bend portions.

The battery 2500 illustrated in FIG. 11 includes the linear portion located on a side of the second portion 102 opposite the side in contact with the first portion 101.

The battery 2500 illustrated in FIG. 11 has a repetitive structure located on a side of the third portion 103 opposite the side in contact with the first portion 101, the repetitive structure including the linear portion and the bend portion.

In the second embodiment, the number of the linear portions and the number of the bend portions are not particularly limited as long as the battery having a zigzag structure includes two or more linear portions and two or more bend portions.

In other words, the battery according to the second embodiment may have a zigzag structure in which linear portions and bend portions are more repeated than the exemplary structure illustrated in FIG. 11.

In the battery 2500 illustrated in FIG. 11, portions of the positive electrode current collector PC having the zigzag structure and facing together are spaced apart from each other.

In the battery 2500 illustrated in FIG. 11, portions of the negative electrode current collector NC having the zigzag structure and facing together are spaced apart from each other.

In the second embodiment, the portions of the positive electrode current collector PC having the zigzag structure and facing together may be in contact with each other. This structure results in a reduction in electronic resistance to improve the charge-discharge characteristics.

In the second embodiment, the portions of the negative electrode current collector NC having the zigzag structure and facing together may be in contact with each other. This structure results in a reduction in electronic resistance to improve the charge-discharge characteristics.

Each of the bend portions may have a width (thickness in the x direction) of 1 to 50,000 μm.

At a width of the bend portion less than 1 μm, the width of a fold of the zigzag structure is larger than the width of the bend portion, thereby possibly causing strain or cracking.

At a width of the bend portion more than 50,000 μm, the energy density of the battery can be reduced.

In the exemplary structures illustrated in FIGS. 6 to 11, the second portion 102 and the third portion 103 are bent in different directions.

The second portion 102 and the third portion 103 may be bent in the same direction.

Figure 12:
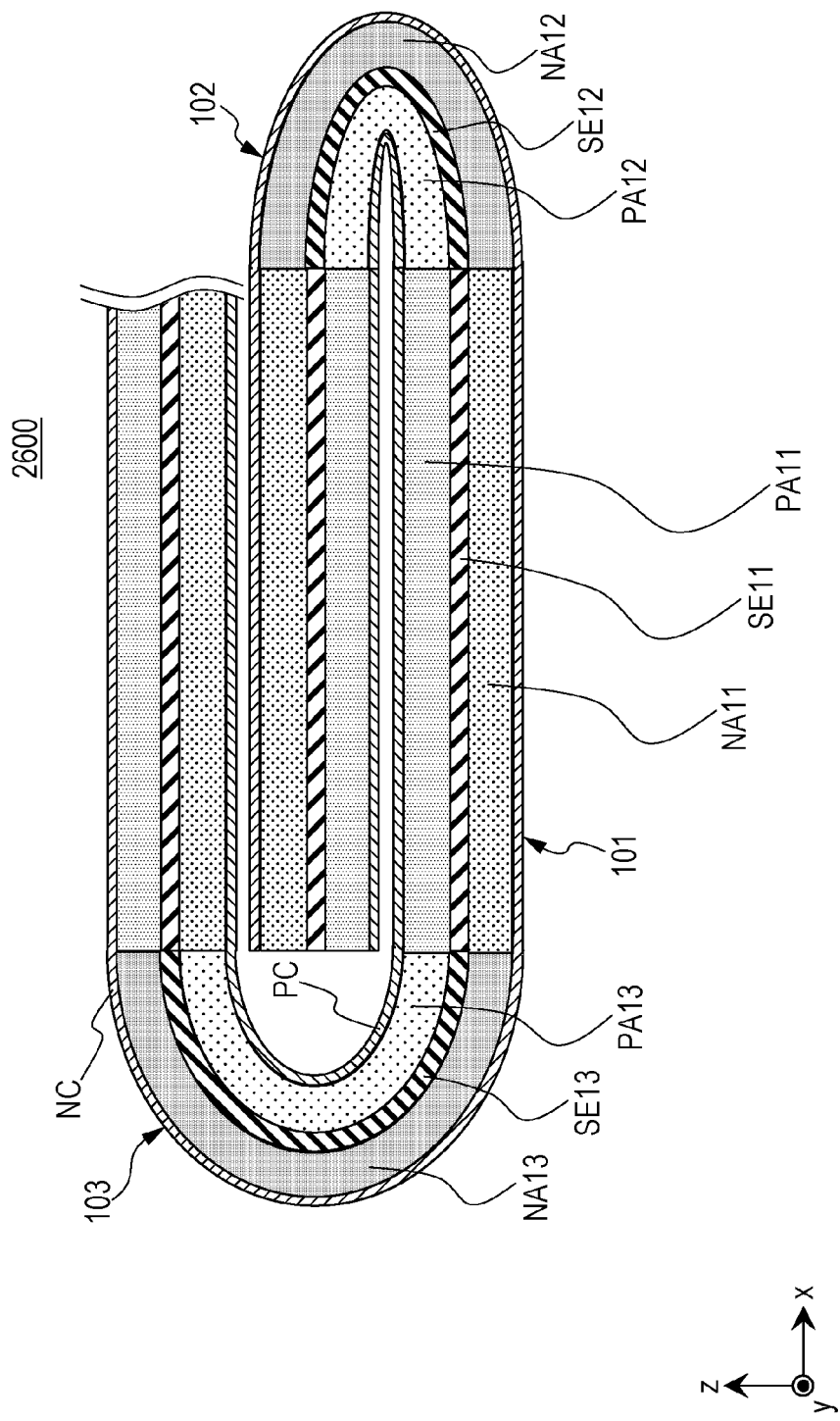
FIG. 12 is a cross-sectional view illustrating the schematic structure of a battery according to a modification of the second embodiment.

FIG. 12 is a cross-sectional view illustrating the schematic structure of a battery 2600 according to a modification of the second embodiment.

The battery 2600 illustrated in FIG. 12 is an example of a battery having a flat winding structure.

FIG. 12 illustrates three linear portions and two bend portions.

The battery 2600 illustrated in FIG. 12 includes the linear portion located on a side of the second portion 102 opposite the side in contact with the first portion 101.

The battery 2600 illustrated in FIG. 12 includes the linear portion located on a side of the third portion 103 opposite the side in contact with the first portion 101.

In the second embodiment, the number of the linear portions and the number of the bend portions are not particularly limited as long as the battery having a winding structure includes one or more linear portions and two or more bend portions.

In other words, the battery according to the second embodiment may have a winding structure in which linear portions and bend portions are more repeated than the exemplary structure illustrated in FIG. 12.

In the battery 2600 illustrated in FIG. 12, a portion of the positive electrode current collector PC and a portion of the negative electrode current collector NC facing together in the winding structure are spaced apart from each other.

In the battery having the winding structure according to the second embodiment, an insulator may be arranged between the portion of the positive electrode current collector PC and the portion of the negative electrode current collector NC facing together in the winding structure.

In the second embodiment, each of the battery having the zigzag structure and the battery having the flat winding structure may be an all-solid-state lithium secondary battery.

In the case of an all-solid-state lithium secondary battery for, for example, mobile electronic devices, such as smartphones and digital cameras, the area of a main surface of the battery may be 1 to 100 cm$^2$.

In the case of an all-solid-state lithium secondary battery used as, for example, a power source for large vehicles, such as electric cars, the area of a main surface of the battery may be 100 to 1000 cm$^2$.

Method for Producing Battery

An example of a method for producing the batteries according to the first and second embodiments will be described below.

Figure 13:
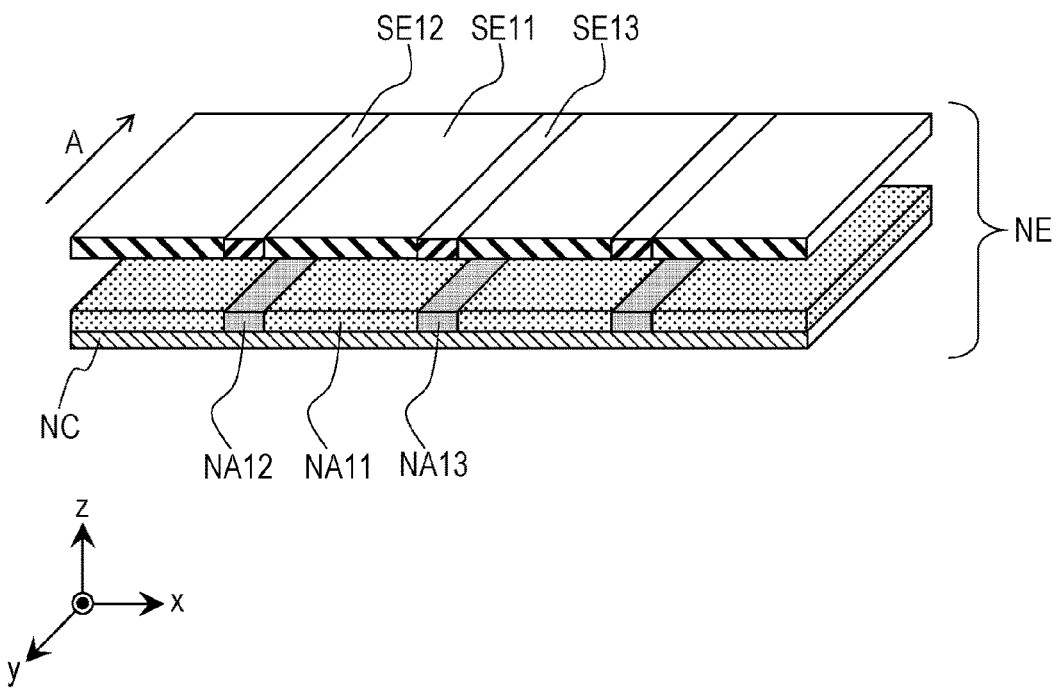
FIG. 13 illustrates a method for producing a negative electrode.

FIG. 13 illustrates a method for producing a negative electrode NE.

The method for producing a negative electrode NE includes step A1 and step A2.

Step A1 is a step of adding a solvent to materials to prepare pastes to be formed into the first negative electrode layer NA11, the second negative electrode layer NA12, and the third negative electrode layer NA13 and applying the pastes onto the negative electrode current collector NC with a slit die.

Step A2 is a step of adding a solvent to materials to prepare pastes to be formed into the first solid electrolyte layer SE11, the second solid electrolyte layer SE12, and the third solid electrolyte layer SE13 and applying the pastes onto the first negative electrode layer NA11, the second negative electrode layer NA12, and the third negative electrode layer NA13, respectively, with a slit die.

The direction of the application may be a direction indicated by arrow A illustrated in FIG. 13.

Similarly, negative electrode layers in another linear portion and another bend portion may be formed on the negative electrode current collector NC.

Figure 14:
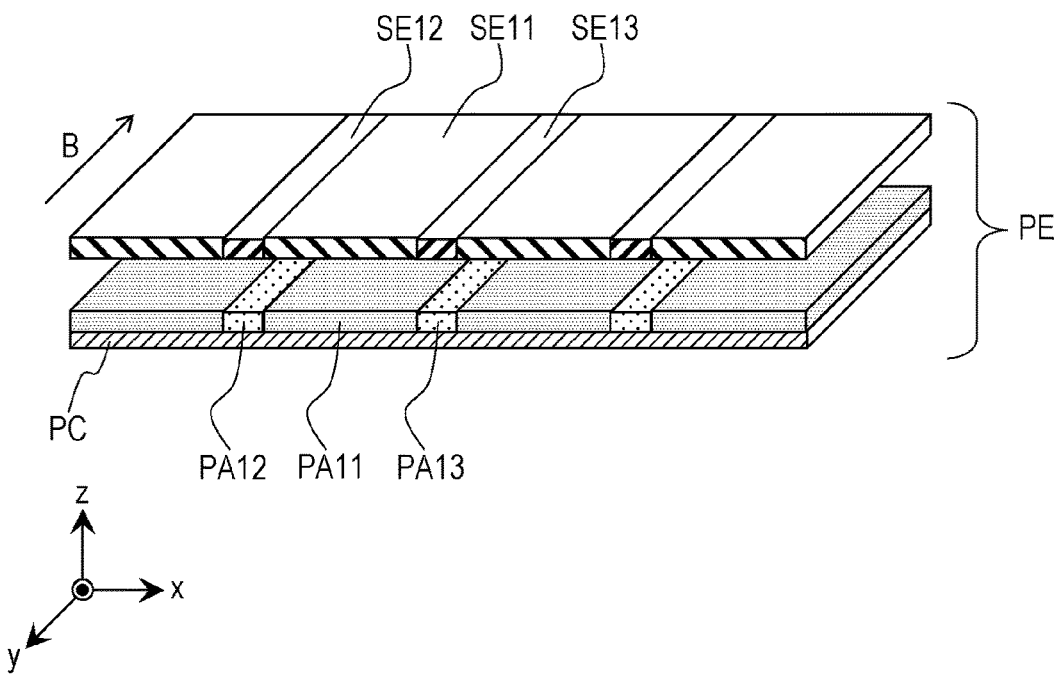
FIG. 14 illustrates a method for producing a positive electrode.

FIG. 14 illustrates a method for producing a positive electrode PE.

The method for producing the positive electrode PE includes step A3 and step A4.

Step A3 is a step of adding a solvent to materials to prepare pastes to be formed into the first positive electrode layer PA11, the second positive electrode layer PA12, and the third positive electrode layer PA13 and applying the pastes onto the positive electrode current collector PC with a slit die.

Step A4 is a step of adding a solvent to materials to prepare pastes to be formed into the first solid electrolyte layer SE11, the second solid electrolyte layer SE12, and the third solid electrolyte layer SE13 and applying the pastes onto the first positive electrode layer PA11, the second positive electrode layer PA12, and the third positive electrode layer PA13, respectively, with a slit die.

The direction of the application may be a direction indicated by arrow B illustrated in FIG. 14.

Similarly, positive electrode layers in another linear portion and another bend portion may be formed on the positive electrode current collector PC.

Figure 15:
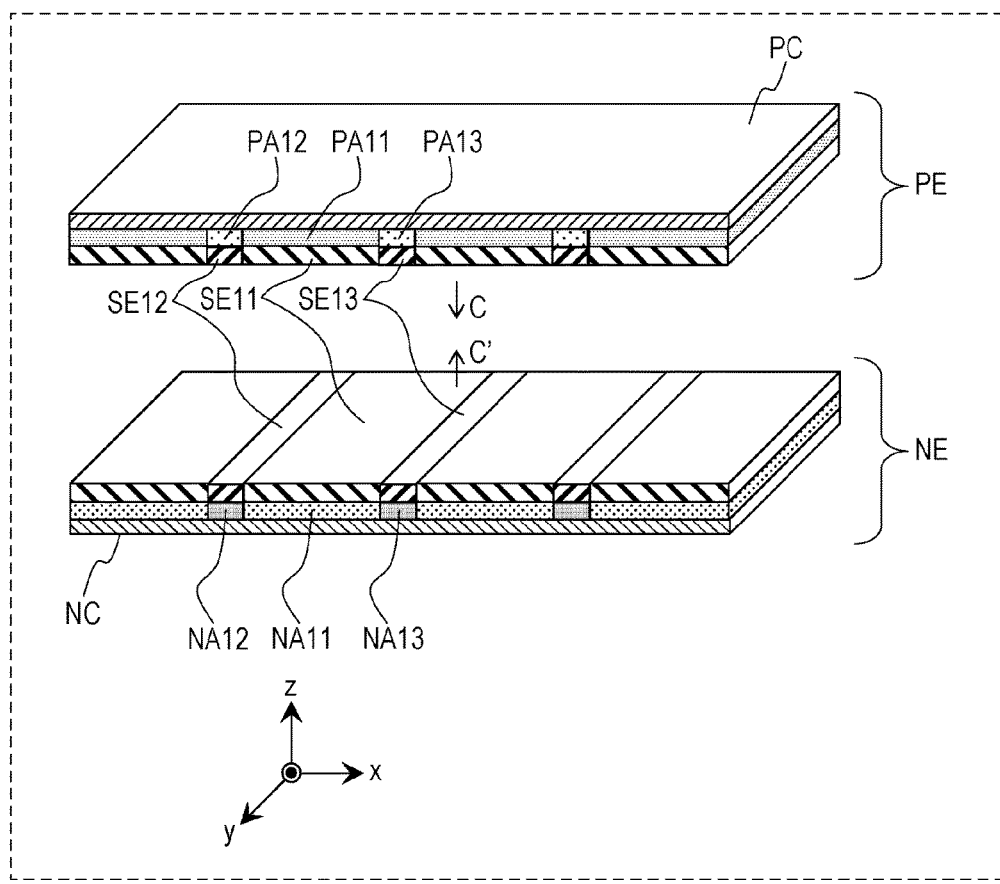
FIG. 15 illustrates a method for producing a battery.

FIG. 15 illustrates a method for producing a battery.

The battery is produced by pressure bonding of the negative electrode NE and the positive electrode PE (step A5).

At this time, the pressure bonding is performed in such a manner that the positions of the solid electrolyte layers in the negative electrode NE are matched to the positions of the solid electrolyte layers in the positive electrode PE.

The directions of the pressure bonding may be directions indicated by arrows C and C' illustrated in FIG. 15.

The second portion 102 and the third portion 103 of the battery producing in step A5 are bent (step A6).

At this time, the structure (for example, winding structure or zigzag structure) of the battery may be determined, depending on a folding method.

The positive electrode current collector PC may be provided with a positive electrode terminal (step A7).

The negative electrode current collector NC may be provided with a negative electrode terminal (step A8).

For example, the binder concentrations in the positive electrode layer, the solid electrolyte layer, and the negative electrode layer may be adjusted by adjusting the binder contents of the pastes used in steps A1 to A4.

Figure 16:
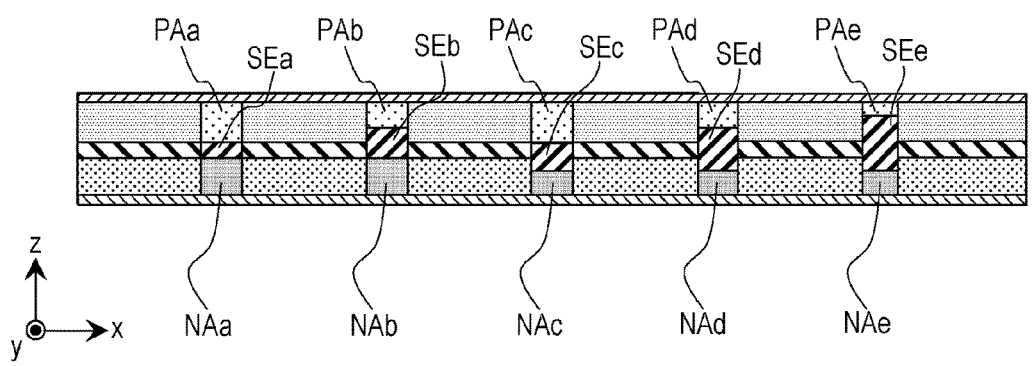
FIG. 16 is a cross-sectional view of the schematic structure of a battery.

FIG. 16 is a cross-sectional view illustrating the schematic structure of a battery.

For example, the batteries according to the modifications of the first and second embodiments may be produced by appropriately adjusting the width (thickness in the x direction) and the thickness in the z direction of each of the layers formed by the application.

In the case of a structure including a positive electrode layer PAa, a solid electrolyte layer SEa, and a negative electrode layer NAa in FIG. 16, the batteries 1000 and 2000 are produced.

In the case of a structure including a positive electrode layer PAb, a solid electrolyte layer SEb, and a negative electrode layer NAb in FIG. 16, the batteries 1100 and 2100 are produced.

In the case of a structure including a positive electrode layer PAc, a solid electrolyte layer SEc, and a negative electrode layer NAc in FIG. 16, the batteries 1200 and 2200 are produced.

In the case of a structure including a positive electrode layer PAd, a solid electrolyte layer SEd, and a negative electrode layer NAd in FIG. 16, the batteries 1300 and 2300 are produced.

In the case of a structure including a positive electrode layer PAe, a solid electrolyte layer SEe, and a negative electrode layer NAe in FIG. 16, the batteries 1400 and 2400 are produced.

Third Embodiment

A third embodiment will be described below. The same descriptions as in the first or second embodiment are not redundantly repeated.

FIG. 17 is a cross-sectional view illustrating the schematic structure of a battery 3000 according to the third embodiment.

The battery 3000 according to the third embodiment has the following structure in addition to the structure described in the first embodiment.

The battery 3000 according to the third embodiment includes a first layer, a second layer, and a collector layer C1.

The first layer includes the first portion 101 and the second portion 102.

The first portion 101 and the second portion 102 have the structures described in the first embodiment.

The second layer includes a fourth portion 201 and a fifth portion 202.

The fourth portion 201 includes a fourth positive electrode layer PA21, a fourth negative electrode layer NA21, and a fourth solid electrolyte layer SE21.

The fourth solid electrolyte layer SE21 is located between the fourth positive electrode layer PA21 and the fourth negative electrode layer NA21.

The fifth portion 202 includes a fifth positive electrode layer PA22, a fifth negative electrode layer NA22, and a fifth solid electrolyte layer SE22.

The fifth solid electrolyte layer SE22 is located between the fifth positive electrode layer PA22 and the fifth negative electrode layer NA22.

The fourth portion 201 and the fifth portion 202 are in contact with each other. The fifth portion 202 is more sharply bent than the fourth portion 201.

A binder concentration in the fourth positive electrode layer PA21 is denoted as $C_{p4}$ (% by weight). A binder concentration in the fifth positive electrode layer PA22 is denoted as $C_{p5}$ (% by weight). A binder concentration in the fourth solid electrolyte layer SE21 is denoted as $C_{e4}$ (% by weight). A binder concentration in the fifth solid electrolyte layer SE22 is denoted as $C_{e5}$ (% by weight). A binder concentration in the fourth negative electrode layer NA21 is denoted as $C_{n4}$ (% by weight). A binder concentration in the fifth negative electrode layer NA22 is denoted as $C_{n5}$ (% by weight).

At least one of $C_{p4}<C_{p5}$, $C_{e4}<C_{e5}$, and $C_{n4}<C_{n5}$ is satisfied (for example, $<C_{p5}$, $C_{e4}<C_{e5}$, and $C_{n4}<C_{n5}$ may all be satisfied).

The first layer, the second layer, and the collector layer C1 are stacked.

One side of the collector layer C1 is in contact with the first negative electrode layer NA11 and the second negative electrode layer NA12.

The other side of the collector layer C1 is in contact with the fourth positive electrode layer PA21 and the fifth positive electrode layer PA22.

The second portion 102, the collector layer C1, and the fifth portion 202 are bent in the same direction.

In the case of the foregoing structure, a reduction in energy density due to the binder is inhibited in the fourth portion (for example, the linear portion) while a reduction in energy density due to strain or internal stresses is inhibited in the fifth portion (for example, the bend portion). This results in the battery with higher energy density.

The material or structure of the fourth portion 201 may be the same as that of the first portion 101 according to the first embodiment.

The material or structure of the fifth portion 202 may be the same as that of the second portion 102 according to the first embodiment.

The battery 3000 according to the third embodiment is an example of a bipolar battery.

The stack structure of the battery 3000 according to the third embodiment is an example of bipolar stack structures.

The bipolar stack structure includes a bipolar electrode as a constituent element and at least two power-generating elements each including a positive electrode layer, a solid electrolyte layer, and a negative electrode layer, the at least two power-generating elements being serially connected with a current collector (collector layer).

The term "bipolar electrode" refers to an electrode in which a positive electrode active material layer lies on one side of the current collector and a negative electrode active material layer lies on the other side of the current collector.

The collector layer C1 may be formed of different current collectors, one of the current collectors being arranged on a side of the collector layer C1 adjacent to the positive electrode, and the other being arranged on a side of the collector layer C1 adjacent to the negative electrode. In other words, the collector layer C1 may have a structure in which the positive electrode current collector PC and the negative electrode current collector NC according to the first embodiment are bonded together.

The collector layer C1 may be formed of a current collector common to both the side of the collector layer C1 adjacent to the positive electrode and the side of the collector layer C1 adjacent to the negative electrode. In other words, the collector layer C1 may be formed of the positive electrode current collector PC or the negative electrode current collector NC according to the first embodiment.

As illustrated in FIG. 17, the second portion 102, the collector layer C1, and the fifth portion 202 may be bent toward a side on which the fourth portion 201 lies.

FIG. 18 is a cross-sectional view illustrating the schematic structure of a battery 3100 according to a modification of the third embodiment.

As illustrated in FIG. 18, the second portion 102, the collector layer C1, and the fifth portion 202 may be bent toward a side on which the first portion 101 lies. This structure also provides the foregoing effects.

Fourth Embodiment

A fourth embodiment will be described below. The same descriptions as in any of the first to third embodiments are not redundantly repeated.

Figure 19:
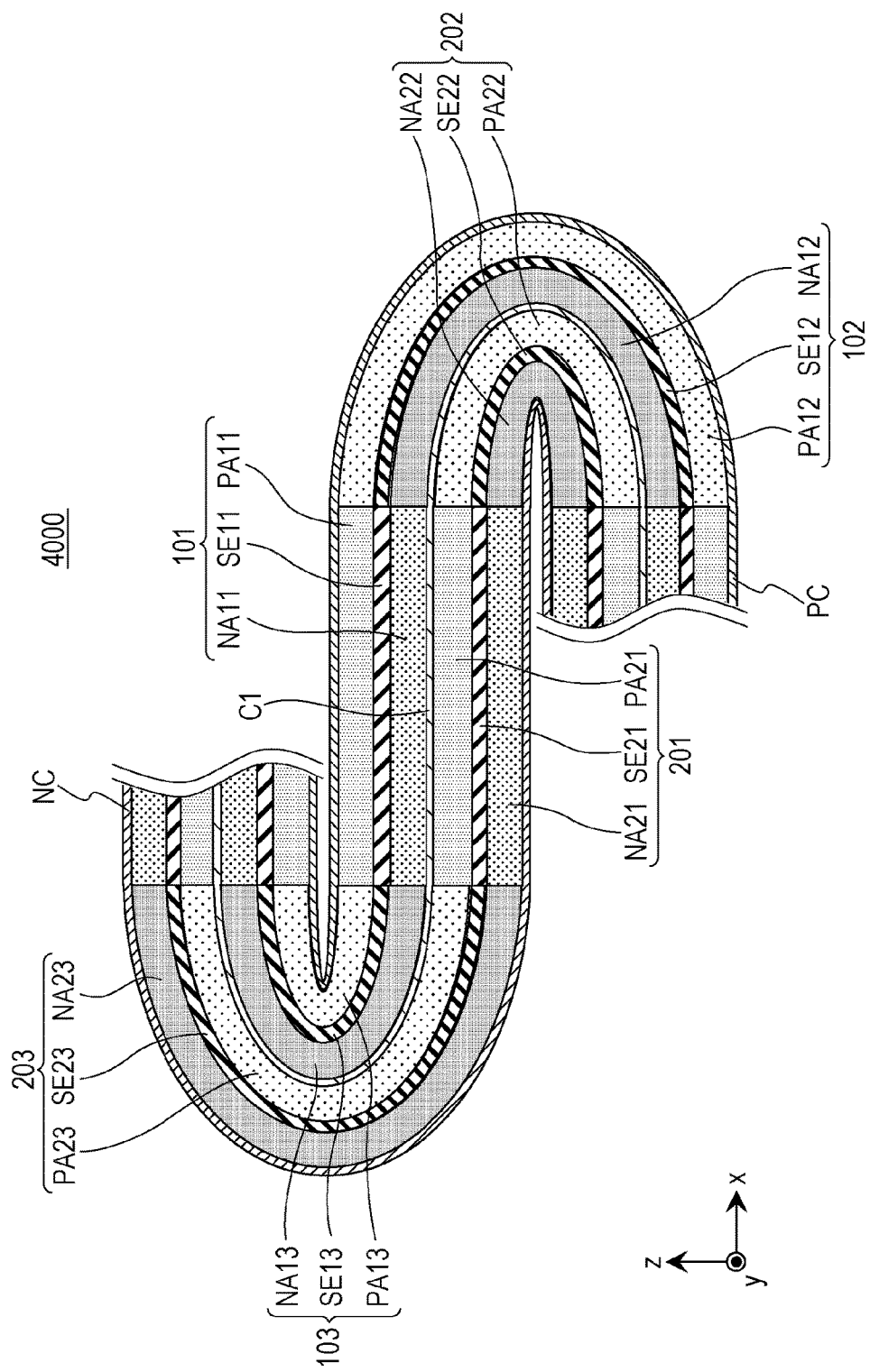
FIG. 19 is a cross-sectional view of the schematic structure of a battery according to a fourth embodiment.

FIG. 19 is a cross-sectional view illustrating the schematic structure of a battery 4000 according to the fourth embodiment.

The battery 4000 according to the fourth embodiment has the following structure in addition to the structure described in the third embodiment.

In the battery 4000 according to the fourth embodiment, the first layer includes the third portion 103.

The third portion 103 has the structure described in the second embodiment.

The second layer includes a sixth portion 203.

The sixth portion 203 includes a sixth positive electrode layer PA23, a sixth negative electrode layer NA23, and a sixth solid electrolyte layer SE23.

The sixth solid electrolyte layer SE23 is located between the sixth positive electrode layer PA23 and the sixth negative electrode layer NA23.

The fourth portion 201 and the sixth portion 203 are in contact with each other. The sixth portion 203 is more sharply bent than the fourth portion 201.

A binder concentration in the sixth positive electrode layer PA23 is denoted as $C_{p6}$ (% by weight). A binder concentration in the sixth solid electrolyte layer SE23 is denoted as $C_{e6}$ (% by weight). A binder concentration in the sixth negative electrode layer NA23 is denoted as $C_{n6}$ (% by weight).

At least one of $C_{p4}<C_{p6}$, $C_{e4}<C_{e6}$, and $C_{n4}<C_{n6}$ is satisfied (for example, $<C_{p6}$, $C_{e4}<C_{e6}$, and $C_{n4}<C_{n6}$ may all be satisfied).

One side of the collector layer C1 is in contact with the first negative electrode layer NA11, the second negative electrode layer NA12, and the third negative electrode layer NA13.

The other side of the collector layer C1 is in contact with the fourth positive electrode layer PA21, the fifth positive electrode layer PA22, and the sixth positive electrode layer PA23.

The third portion 103, the collector layer C1, and the sixth portion 203 are bent in the same direction.

In the case of the foregoing structure, a reduction in energy density due to the binder is inhibited in the fourth portion (for example, the linear portion) while a reduction in energy density due to strain or internal stresses is inhibited in the sixth portion (for example, the bend portion). This results in the battery with higher energy density.

The material or structure of the sixth portion 203 may be the same as that of the third portion 103 according to the second embodiment.

As illustrated in FIG. 19, the third portion 103, the collector layer C1, and the sixth portion 203 may be bent toward a side on which the first portion 101 lies.

Alternatively, the third portion 103, the collector layer C1, and the sixth portion 203 may be bent toward a side on which the fourth portion 201 lies. This structure also provides the foregoing effects.

The number of power-generating elements stacked may be appropriately set, depending on, for example, the application of the battery. For example, the number of power-generating elements stacked may be 3 or more.

FIG. 20 is a cross-sectional view illustrating the schematic structure of a battery 4100 according to a modification of the fourth embodiment.

In FIG. 20, for the sake of simplification, a positive electrode layer, a negative electrode layer, and a solid electrolyte layer are illustrated as a single layer.

The battery 4100 illustrated in FIG. 20 is an example of a bipolar battery having a zigzag structure.

The battery 4100 illustrated in FIG. 20 has a three-layer structure.

Specifically, the battery 4100 illustrated in FIG. 20 includes a third layer and a second collector layer C2, in addition to the first layer, the second layer, and the collector layer C1.

The third layer includes a seventh portion 301, an eighth portion 302, and a ninth portion 303.

The battery 4100 illustrated in FIG. 20, the first layer, the second layer, and the third layer are serially connected (stacked) with the collector layers C1 and the second collector layer C2.

The material or structure of the third layer may be the same as that of the first layer or the second layer.

The material or structure of the second collector layer C2 may be the same as that of the collector layer C1.

In each of the first layer and the second layer, the structure of the battery 2500 according to the second embodiment may be appropriately used.

In the positive electrode current collector PC, the negative electrode current collector NC, and so forth, the structure of the battery 2500 according to the second embodiment may also be appropriately used.

In the exemplary structures illustrated in FIGS. 19 and 20, the second portion 102 and the fifth portion 202 are bent in a direction different from a direction in which the third portion 103 and the sixth portion 203 are bent.

The second portion 102 and the fifth portion 202 may be bent in the same direction as that in which the third portion 103 and the sixth portion 203 are bent.

FIG. 21 is a cross-sectional view illustrating the schematic structure of a battery 4200 according to a modification of the fourth embodiment.

In FIG. 21, for the sake of simplification, a positive electrode layer, a negative electrode layer, and a solid electrolyte layer are illustrated as a single layer.

The battery 4200 illustrated in FIG. 21 is an example of a bipolar battery having a flat winding structure.

In each of the first layer and the second layer of the battery 4200 illustrated in FIG. 21, the structure of the battery 2600 according to the second embodiment may be appropriately used.

In the positive electrode current collector PC, the negative electrode current collector NC, and so forth, the structure of the battery 2600 according to the second embodiment may also be appropriately used.

Fifth Embodiment

A fifth embodiment will be described below. The same descriptions as in any of the first to fourth embodiments are not redundantly repeated.

FIG. 22 is a cross-sectional view illustrating the schematic structure of a battery 5000 according to the fifth embodiment.

The battery 5000 according to the fifth embodiment has the following structure in addition to the structure described in the third embodiment.

In the battery 5000 according to the fifth embodiment, the second portion 102, the collector layer C1, and the fifth portion 202 are bent toward a side on which the fourth portion 201 lies.

In this case, the fifth portion 202 has a smaller width (W22) than the width (W12) of the second portion 102.

The structure inhibits an excessive increase in the width of the fifth portion (for example, the bend portion) to achieve a larger width of the fourth portion (for example, the linear portion) having a relatively low binder content. This further inhibits a reduction in energy density due to the binder in the second layer, thus resulting in the battery with higher energy density.

In the second portion 102, the width (W12p) of the second positive electrode layer PA12, the width (W12n) of the second negative electrode layer NA12, and the width (W12s) of the second solid electrolyte layer SE12 may be different from one another.

In this case, the width (W12) of the second portion 102 may be defined as the maximum value of W12p, W12n, and W12s.

Similarly, each of the width (W22) of the fifth portion 202, the width (W13) of the third portion 103, the width (W23) of the sixth portion 203, and so forth may be defined as the maximum value of widths of the positive electrode layer, the negative electrode layer, and the solid electrolyte layer, thereof, respectively.

FIG. 23 is a cross-sectional view illustrating the schematic structure of a battery 5100 according to a modification of the fifth embodiment.

The battery 5100 according to the fifth embodiment has the following structure in addition to the structure described in the third embodiment.

In the battery 5100 according to the fifth embodiment, the second portion 102, the collector layer C1, and the fifth portion 202 are bent toward a side on which the first portion 101 lies.

In this case, the second portion 102 has a smaller width (W12) than the width (W22) of the fifth portion 202.

The structure inhibits an excessive increase in the width of the second portion (for example, the bend portion) to achieve a larger width of the first portion (for example, the linear portion) having a relatively low binder content. This further inhibits a reduction in energy density due to the binder in the first layer, thus resulting in the battery with higher energy density.

Figure 24:
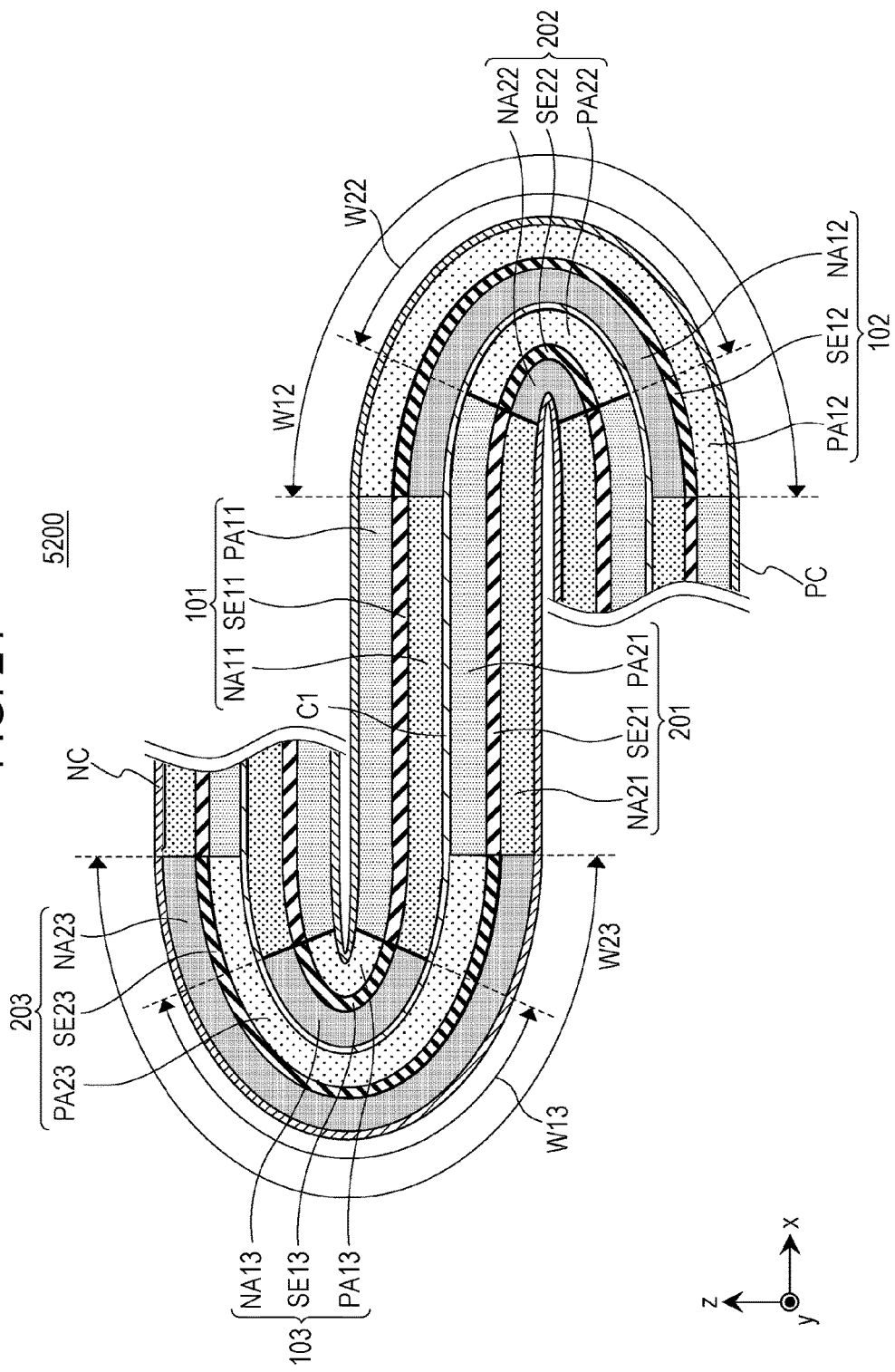
FIG. 24 is a cross-sectional view of the schematic structure of a battery according to a modification of the fifth embodiment.

FIG. 24 is a cross-sectional view illustrating the schematic structure of a battery 5200 according to a modification of the fifth embodiment.

The battery 5200 according to the fifth embodiment has the following structure in addition to the structure described in the fourth embodiment.

In the battery 5200 according to the fifth embodiment, the third portion 103, the collector layer C1, and the sixth portion 203 are bent toward a side on which the first portion 101 lies.

In this case, the third portion 103 has a smaller width (W13) than the width (W23) of the sixth portion 203.

The structure inhibits an excessive increase in the width of the third portion (for example, the bend portion) to achieve a larger width of the first portion (for example, the linear portion) having a relatively low binder content. This further inhibits a reduction in energy density due to the binder in the first layer, thus resulting in the battery with higher energy density.

The battery 5200 illustrated in FIG. 24 also has the structure of the battery 5000 illustrated in FIG. 22.

Thus, the battery 5200 illustrated in FIG. 24 also provides the same effects as in the battery 5000.

Figure 25:
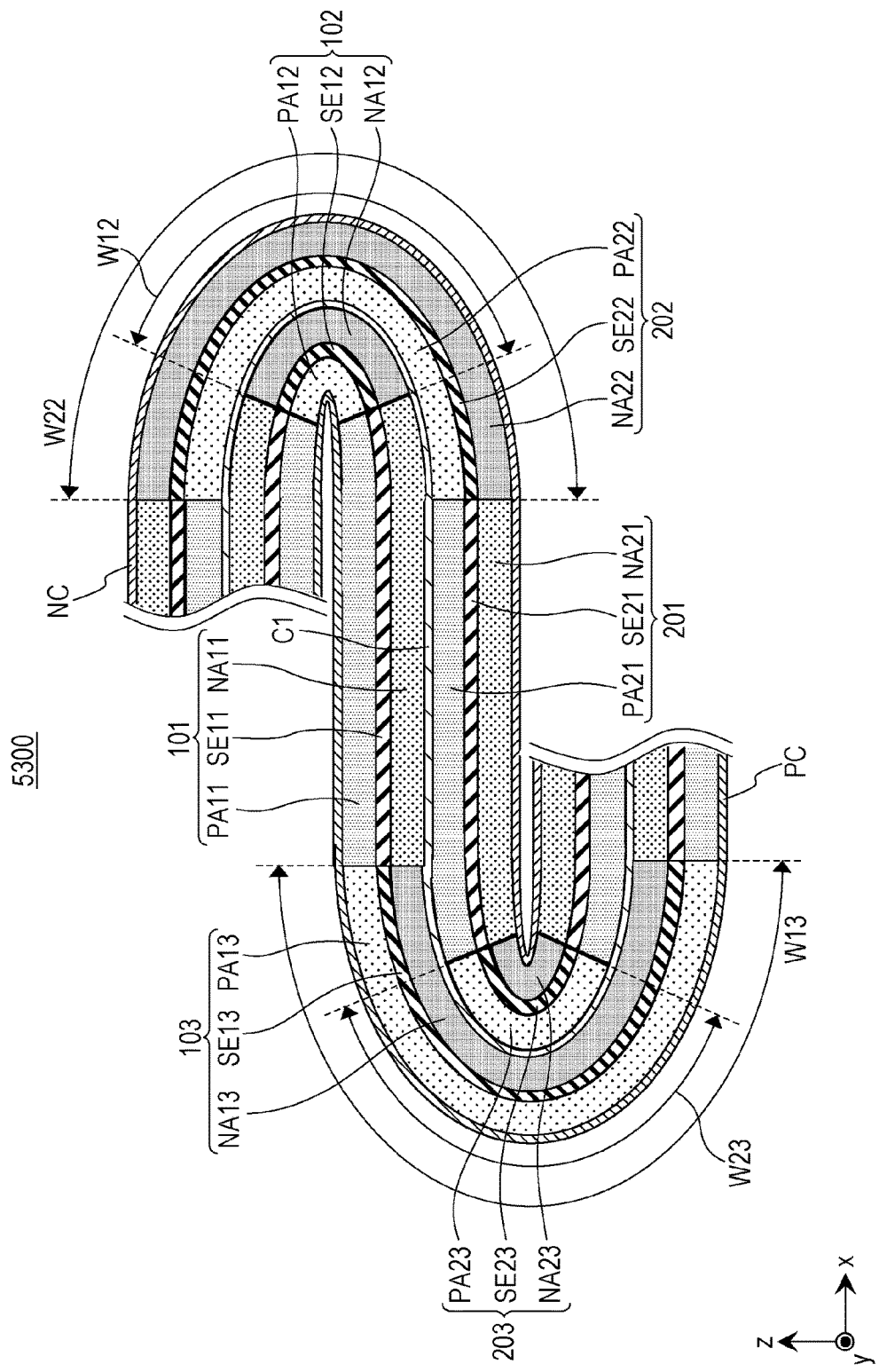
FIG. 25 is a cross-sectional view of the schematic structure of a battery according to a modification of the fifth embodiment.

FIG. 25 is a cross-sectional view of the schematic structure of a battery 5300 according to a modification of the fifth embodiment.

The battery 5300 according to the fifth embodiment has the following structure in addition to the structure described in the fourth embodiment.

In the battery 5300 according to the fifth embodiment, the third portion 103, the collector layer C1, and the sixth portion 203 are bent toward a side on which the fourth portion 201 lies.

In this case, the sixth portion 203 has a smaller width (W23) than the width (W13) of the third portion 103.

The structure inhibits an excessive increase in the width of the sixth portion (for example, the bend portion) to achieve a larger width of the fourth portion (for example, the linear portion) having a relatively low binder content. This further inhibits a reduction in energy density due to the binder in the second layer, thus resulting in the battery with higher energy density.

The battery 5300 illustrated in FIG. 25 also has the structure of the battery 5100 illustrated in FIG. 23.

Thus, the battery 5300 illustrated in FIG. 25 also provides the same effects as in the battery 5100.

In the fifth embodiment, the number of power-generating elements stacked may be, for example, 3 or more.

Figure 26:
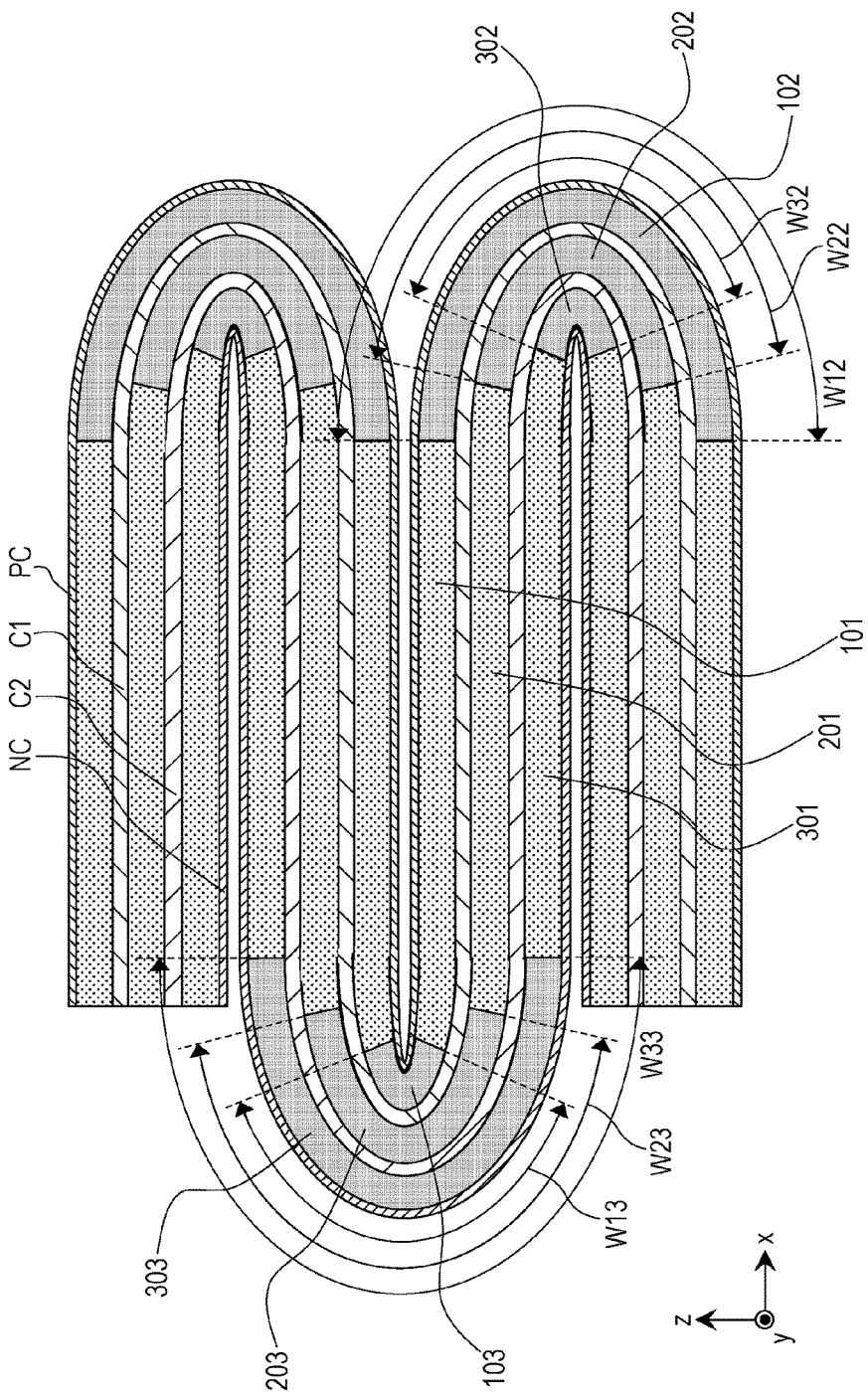
FIG. 26 is a cross-sectional view of the schematic structure of a battery according to a modification of the fifth embodiment.

FIG. 26 is a cross-sectional view illustrating the schematic structure of a battery 5400 according to a modification of the fifth embodiment.

The battery 5400 illustrated in FIG. 26 is an example of a bipolar battery having a zigzag structure.

The battery 5400 according to the fifth embodiment has the following structure in addition to the structure of the battery 4100 illustrated in FIG. 20 according to the fourth embodiment.

In the battery 5400 according to the fifth embodiment, the following relational expressions are satisfied: W12>W22>W32, and W33>W23>W13.

Here, W32 is denoted as the width of the eighth portion 302. W33 is denoted as the width of the ninth portion 303.

The structure inhibits an excessive increase in the width of the eighth portion (for example, the bend portion) to achieve a larger width of the seventh portion (for example, the linear portion) having a relatively low binder content. This further inhibits a reduction in energy density due to the binder in the third layer, thus resulting in the battery with higher energy density.

Figure 27:
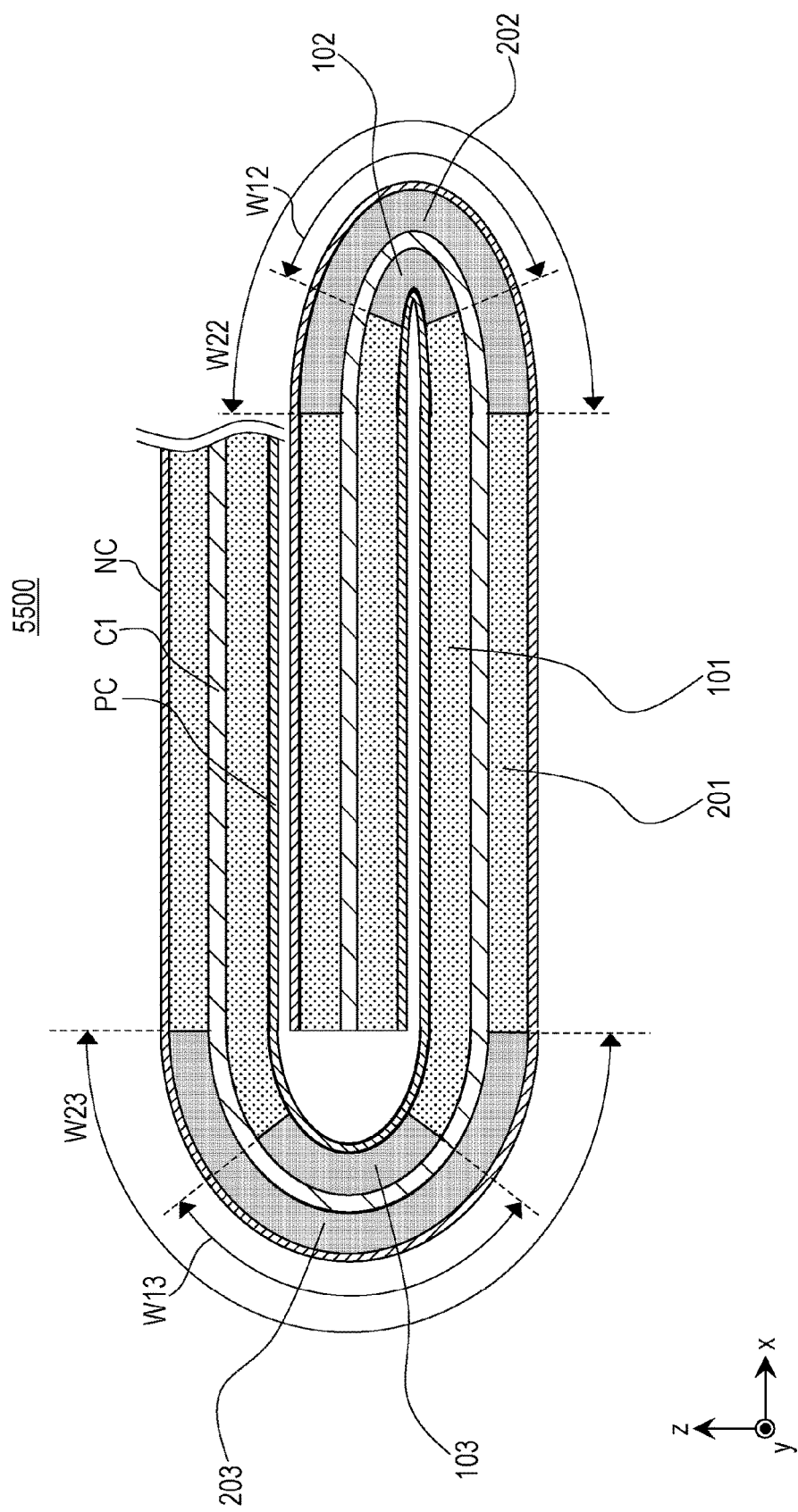
FIG. 27 is a cross-sectional view of the schematic structure of a battery according to a modification of the fifth embodiment.

FIG. 27 is a cross-sectional view illustrating the schematic structure of a battery 5500 according to a modification of the fifth embodiment.

The battery 5500 illustrated in FIG. 27 is an example of a bipolar battery having a flat winding structure.

The battery 5500 according to the fifth embodiment has the following structure in addition to the structure of the battery 4200 illustrated in FIG. 21 according to the fourth embodiment.

In the battery 5500 according to the fifth embodiment, the following relational expressions are satisfied: W22>W12, and W23>W13.

The structure inhibits an excessive increase in the width of each of the second portion and the third portion to achieve a larger width of the first portion having a relatively low binder content. This further inhibits a reduction in energy density due to the binder in the first layer, thus resulting in the battery with higher energy density.

In the fifth embodiment, the width of a bend portion of a power-generating element located in the outer portion of a fold is larger than the width of a bend portion of a power-generating element located in the inner portion of the fold.

In the bipolar battery, a plurality of power-generating elements is stacked to lead to a large thickness of the battery in the z direction. Thus, the width of the bend portion located in the outer portion of the fold is larger than the width of the bend portion located in the inner portion of the fold.

The width of the bend portion is increased with increasing distance from the inner portion toward the outer portion of the fold, thereby sufficiently inhibiting the occurrence of strain or stresses at the fold. The width of the bend portion is not excessively large, thus resulting in the bipolar battery having high energy density.

Method for Producing Battery

An example of a method for producing the batteries according to the third, fourth, and fifth embodiments will be described below.

Figure 28:
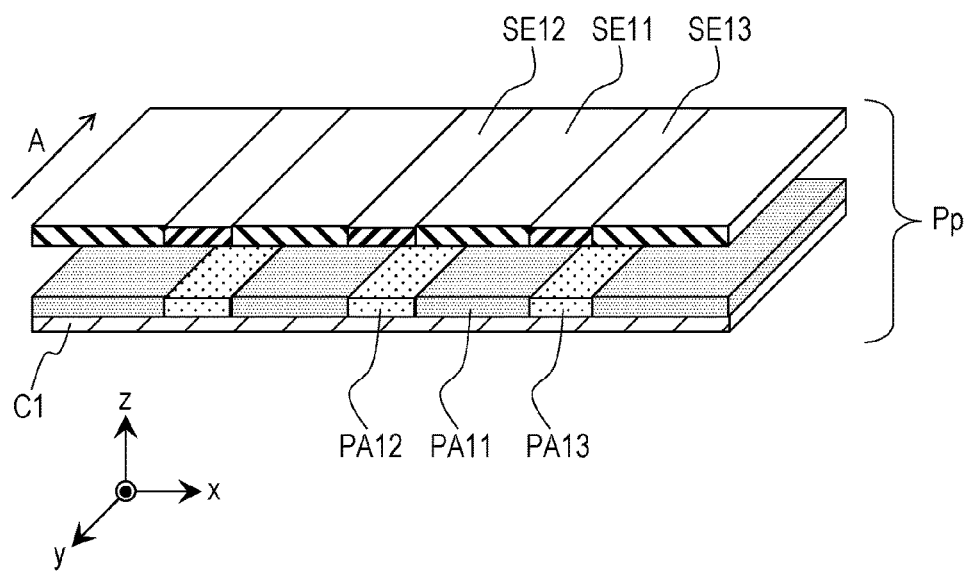
FIG. 28 illustrates a method for producing a positive electrode side portion of a bipolar electrode.

FIG. 28 illustrates a method for producing a positive electrode side portion Pp of a bipolar electrode.

The method for producing the positive electrode side portion Pp of the bipolar electrode includes step B1 and step B2.

Step B1 is a step of adding a solvent to materials to prepare pastes to be formed into the first positive electrode layer PA11, the second positive electrode layer PA12, and the third positive electrode layer PA13 and applying the pastes onto the collector layer C1 with a slit die.

Step B2 is a step of adding a solvent to materials to prepare pastes to be formed into the first solid electrolyte layer SE11, the second solid electrolyte layer SE12, and the third solid electrolyte layer SE13 and applying the pastes onto the first positive electrode layer PA11, the second positive electrode layer PA12, and the third positive electrode layer PA13, respectively, with a slit die.

The direction of the application may be a direction indicated by arrow A illustrated in FIG. 28.

Similarly, positive electrode portions in another linear portion and another bend portion may be formed on the collector layer C1.

Figure 29:
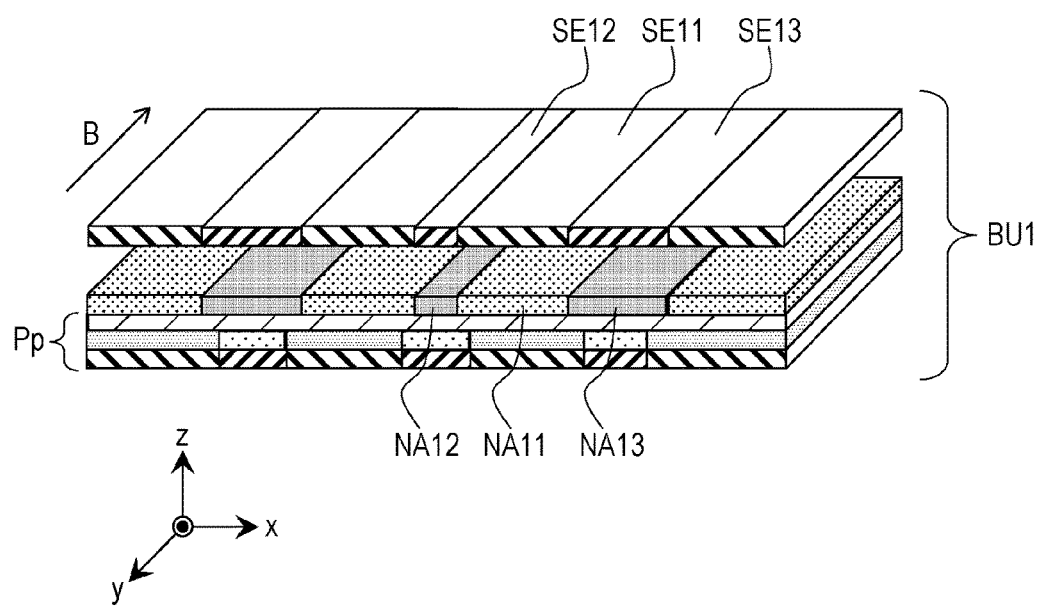
FIG. 29 illustrates a method for producing a bipolar electrode.

FIG. 29 illustrates a method for producing a bipolar electrode BU1.

A method for producing the bipolar electrode BU1 includes step B3 and step B4.

Step B3 is a step of adding a solvent to materials to prepare pastes to be formed into the first negative electrode layer NA11, the second negative electrode layer NA12, and the third negative electrode layer NA13 and applying the pastes onto a main surface of the collector layer C1 of the positive electrode side portion Pp opposite the main surface on which the positive electrode layers are arranged, with a slit die.

Step B4 is a step of adding a solvent to materials to prepare pastes to be formed into the first solid electrolyte layer SE11, the second solid electrolyte layer SE12, and the third solid electrolyte layer SE13 and applying the pastes onto the first negative electrode layer NA11, the second negative electrode layer NA12, and the third negative electrode layer NA13, respectively, with a slit die.

The direction of the application may be a direction indicated by arrow B illustrated in FIG. 29.

Similarly, negative electrode portions in another linear portion and another bend portion may be formed on the collector layer C1.

Another bipolar electrode BU2 is produced (step B5) by steps B1 to B4.

The negative electrode NE is produced (step B6). The negative electrode NE may be produced by, for example, steps A1 and A2 illustrated in FIG. 13.

The positive electrode PE is produced (step B7). The positive electrode PE may be produced by, for example, steps A3 and A4 illustrated in FIG. 14.

Figure 30:
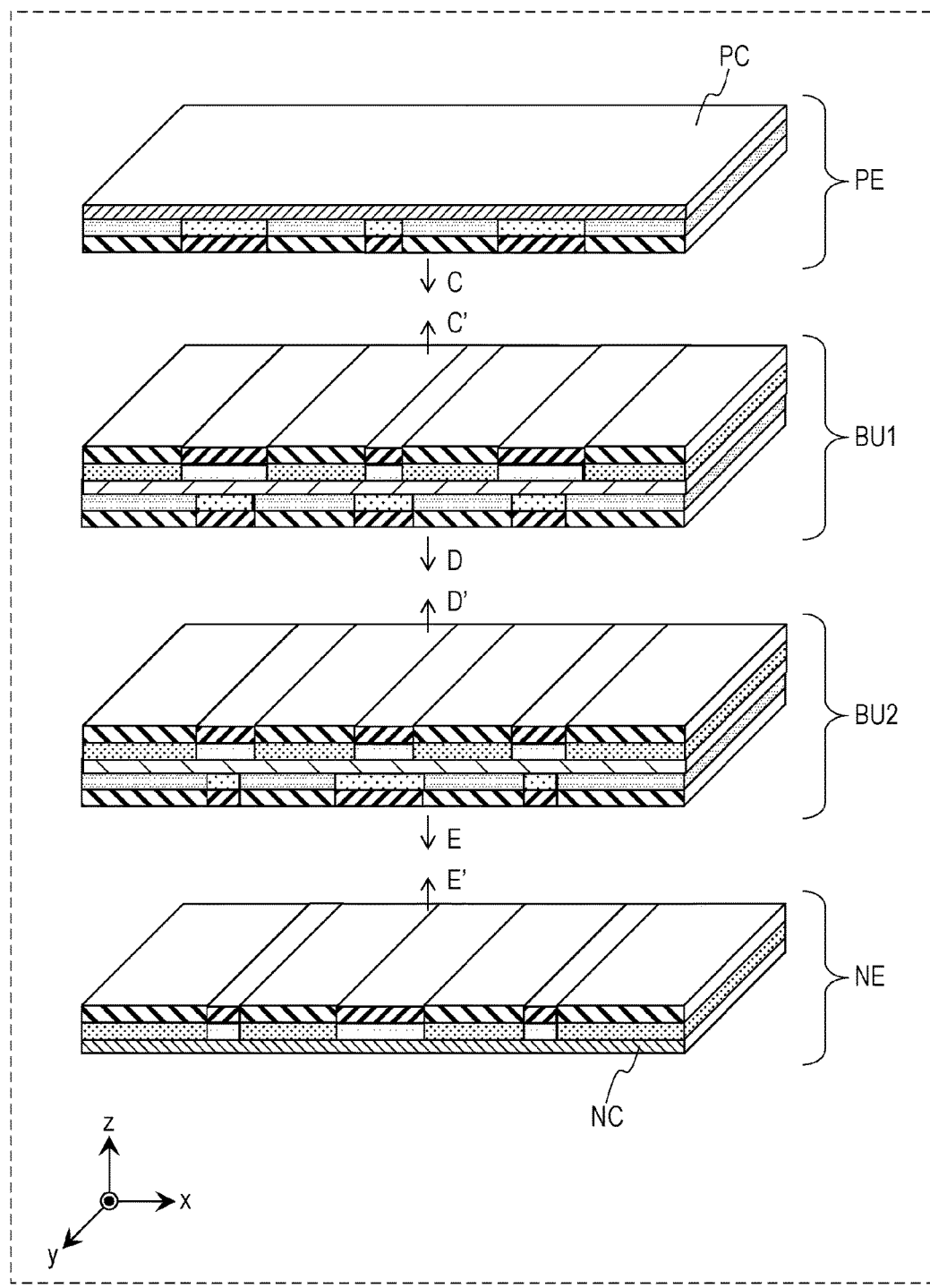
FIG. 30 illustrates a method for producing a battery.

FIG. 30 illustrates a method for producing a battery.

The battery is produced by pressure bonding of the positive electrode PE, the bipolar electrode BU1, the bipolar electrode BU2, and the negative electrode NE (step B8).

At this time, the pressure bonding is performed in such a manner that the positions of the solid electrolyte layers in the positive electrode PE are matched to the positions of the solid electrolyte layers in the bipolar electrode BU1.

The directions of the pressure bonding may be directions indicated by arrows C and C' illustrated in FIG. 30.

Furthermore, the pressure bonding is performed in such a manner that the positions of the solid electrolyte layers in the bipolar electrode BU1 are matched to the positions of the solid electrolyte layers in the bipolar electrode BU2.

The directions of the pressure bonding may be directions indicated by arrows D and D' illustrated in FIG. 30.

Moreover, the pressure bonding is performed in such a manner that the positions of the solid electrolyte layers in the bipolar electrode BU2 are matched to the positions of the solid electrolyte layers in the negative electrode NE.

The directions of the pressure bonding may be directions indicated by arrows E and E' illustrated in FIG. 30.

The second portion 102 and the third portion 103 of the battery produced in step B8 are folded (step B9).

At this time, the structure (for example, winding structure or zigzag structure) of the battery may be determined, depending on a folding method and the width of each layer.

The negative electrode current collector NC may be provided with a negative electrode terminal (step B10).

The positive electrode current collector PC may be provided with a positive electrode terminal (step B11).

The collector layer C1 or the second collector layer C2 may be provided with a terminal used to detect a voltage (step B12).

For example, the binder concentrations in the positive electrode layer, the solid electrolyte layer, and the negative electrode layer may be adjusted by adjusting the binder contents of the pastes used in steps B1 to B7.

Figure 31:
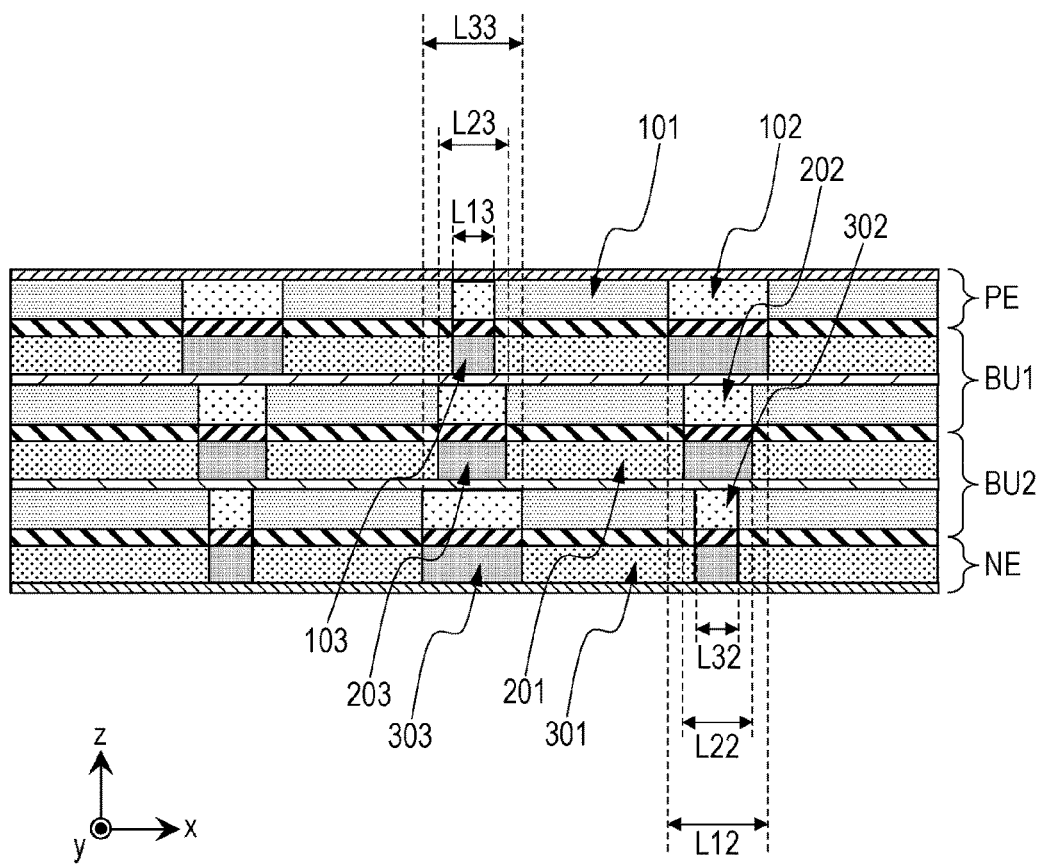
FIG. 31 is a cross-sectional view illustrating the schematic structure of a battery by step B8.

FIG. 31 is a cross-sectional view illustrating the schematic structure of a battery produced in step B8.

For example, the batteries according to the third, fourth, and fifth embodiments may be produced by appropriately adjusting the width (thickness in the x direction) and the thickness in the z direction of each of the layers formed by the application.

As illustrated in FIG. 31, for example, when L32<L22<L12, and L13<L23<L33 are satisfied, the battery 5400 is produced.

In the case where the bipolar electrode BU2 is not used, the battery 5000, 5100, 5200, or 5300 is produced by adjusting the folding method.

The battery 5500 is produced by adjusting the folding method and the width of each layer. Specifically, in the case where the bend portions are bent in the same direction and where L12<L22, and L13<L23 are satisfied, the battery 5500 are produced. In the case of the structure of the battery 5500, the number of power-generating elements stacked is 2.

For example, in the case where L32=L22=L12 and L33=L23=L13 are satisfied, the battery 4100 is produced.

In the case where the bipolar electrode BU2 is not used, the battery 3000, 3100, or 4000 is produced by adjusting the folding method.

The battery 4200 is produced by adjusting the folding method and the width of each layer. Specifically, in the case where the bend portions are bent in the same direction and where L22=L12, and L13=L23 are satisfied, the battery 4200 is produced. In the case of the structure of the battery 4200, the number of power-generating elements stacked is 2.

L12 is denoted as the width of the second portion 102 before folding. L22 is denoted as the width of the fifth portion 202 before folding. L32 is denoted as the width of the eighth portion 302 before folding. L13 is denoted as the width of the third portion 103 before folding. L23 is denoted as the width of the sixth portion 203 before folding. L33 is denoted as the width of the ninth portion 303 before folding.

The structures described in the first to fifth embodiments may be appropriately combined together.

The battery disclosed here may be used as, for example, an all-solid-state lithium secondary battery.

What is claimed is:

1. A battery comprising:
   a first portion; and
   a second portion,
   wherein the first portion includes
   a first positive electrode layer,
   a first negative electrode layer, and
   a first solid electrolyte layer located between the first positive electrode layer and the first negative electrode layer,
   wherein the second portion includes
   a second positive electrode layer,
   a second negative electrode layer, and
   a second solid electrolyte layer located between the second positive electrode layer and the second negative electrode layer,
   wherein the first portion and the second portion are in contact with each other along a thickness direction of the battery,
   the second portion is more sharply bent than the first portion, and
   $C_{p1}<C_{p2}$, $C_{e1}<C_{e2}$, and $C_{n1}<C_{n2}$ are satisfied,
   where $C_{p1}$ denotes a binder concentration that is uniform throughout the first positive electrode layer, $C_{p2}$ denotes a binder concentration that is uniform throughout the second positive electrode layer, $C_{e1}$ denotes a binder concentration in the first solid electrolyte layer, $C_{e2}$ denotes a binder concentration in the second solid electrolyte layer, $C_{n1}$ denotes a binder concentration in the first negative electrode layer, and $C_{n2}$ denotes a binder concentration in the second negative electrode layer.

2. The battery according to claim 1,
   wherein $C_{p2}>C_{n2}$ is satisfied.

3. The battery according to claim 1,
   wherein $D_{p1}>D_{p2}$ is satisfied,
   where $D_{p1}$ denotes the thickness of the first positive electrode layer, and $D_{p2}$ denotes the thickness of the second positive electrode layer.

4. The battery according to claim 1,
   wherein $D_{n1}>D_{n2}$ is satisfied,
   where $D_{n1}$ denotes the thickness of the first negative electrode layer, and $D_{n2}$ denotes the thickness of the second negative electrode layer.

5. The battery according to claim 1,
   wherein $D_{p2}<D_{n2}$ is satisfied, where $D_{p2}$ denotes the thickness of the second positive electrode layer, and $D_{n2}$ denotes the thickness of the second negative electrode layer.

6. The battery according to claim 1, further comprising:
a third portion,
wherein the third portion includes
a third positive electrode layer,
a third negative electrode layer, and
a third solid electrolyte layer located between the third positive electrode layer and the third negative electrode layer,
wherein the first portion and the third portion are in contact with each other,
the third portion is more sharply bent than the first portion, and
at least one of $C_{p1}<C_{p3}$, $C_{e1}<C_{e3}$, and $C_{n1}<C_{n3}$ is satisfied,
where $C_{p3}$ denotes a binder concentration in the third positive electrode layer, $C_{e3}$ denotes a binder concentration in the third solid electrolyte layer, and $C_{n3}$ denotes a binder concentration in the third negative electrode layer.

7. The battery according to claim 6,
wherein $C_{p1}<C_{p3}$, $C_{e1}<C_{e3}$, and $C_{n1}<C_{n3}$ are satisfied.

8. The battery according to claim 6,
wherein $C_{p3}>C_{n3}$ is satisfied.

9. The battery according to claim 6,
wherein $D_{p1}>D_{p3}$ is satisfied,
where $D_{p1}$ denotes the thickness of the first positive electrode layer, and $D_{p3}$ denotes the thickness of the third positive electrode layer.

10. The battery according to claim 6,
wherein $D_{n1}>D_{n3}$ is satisfied,
where $D_{n1}$ denotes the thickness of the first negative electrode layer, and $D_{n3}$ denotes the thickness of the third negative electrode layer.

11. The battery according to claim 6,
wherein $D_{p3}<D_{n3}$ is satisfied,
where $D_{p3}$ denotes the thickness of the third positive electrode layer, and $D_{n3}$ denotes the thickness of the third negative electrode layer.

12. The battery according to claim 1, further comprising:
a first layer;
a second layer; and
a collector layer,
wherein the first layer includes
the first portion, and
the second portion,
wherein the second layer includes
a fourth portion, and
a fifth portion,
wherein the fourth portion includes
a fourth positive electrode layer,
a fourth negative electrode layer, and
a fourth solid electrolyte layer located between the fourth positive electrode layer and the fourth negative electrode layer,
wherein the fifth portion includes
a fifth positive electrode layer,
a fifth negative electrode layer, and
a fifth solid electrolyte layer located between the fifth positive electrode layer and the fifth negative electrode layer,
wherein the fourth portion and the fifth portion are in contact with each other,
the fifth portion is more sharply bent than the fourth portion, and
at least one of $C_{p4}<C_{p5}$, $C_{e4}<C_{e5}$, and $C_{n4}<C_{n5}$ is satisfied,
where $C_{p4}$ denotes a binder concentration in the fourth positive electrode layer, $C_{p5}$ denotes a binder concentration in the fifth positive electrode layer, $C_{e4}$ denotes a binder concentration in the fourth solid electrolyte layer, $C_{e5}$ denotes a binder concentration in the fifth solid electrolyte layer, $C_{n4}$ denotes a binder concentration in the fourth negative electrode layer, and $C_{n5}$ denotes a binder concentration in the fifth negative electrode layer,
wherein the first layer, the second layer, and the collector layer are stacked together,
a first side of the collector layer is in contact with the first negative electrode layer and the second negative electrode layer,
a second side of the collector layer is in contact with the fourth positive electrode layer and the fifth positive electrode layer, and
the second portion, the collector layer, and the fifth portion are bent in the same direction.

13. The battery according to claim 12,
wherein the second portion, the collector layer, and the fifth portion are bent toward a side on which the fourth portion lies, and
the fifth portion has a smaller width than a width of the second portion.

14. The battery according to claim 12,
wherein the second portion, the collector layer, and the fifth portion are bent toward a side on which the first portion lies, and
the second portion has a smaller width than a width of the fifth portion.

15. The battery according to claim 12,
wherein the first layer includes a third portion,
wherein the third portion includes
a third positive electrode layer,
a third negative electrode layer, and
a third solid electrolyte layer located between the third positive electrode layer and the third negative electrode layer,
wherein the first portion and the third portion are in contact with each other,
the third portion is more sharply bent than the first portion,
at least one of $C_{p1}<C_{p3}$, $C_{e1}<C_{e3}$, and $C_{n1}<C_{n3}$ is satisfied,
where $C_{p3}$ denotes a binder concentration in the third positive electrode layer, $C_{e3}$ denotes a binder concentration in the third solid electrolyte layer, and $C_{n3}$ denotes a binder concentration in the third negative electrode layer,
wherein the second layer includes a sixth portion,
the sixth portion includes
a sixth positive electrode layer,
a sixth negative electrode layer, and
a sixth solid electrolyte layer located between the sixth positive electrode layer and the sixth negative electrode layer,
wherein the fourth portion and the sixth portion are in contact with each other,
the sixth portion is more sharply bent than the fourth portion, and
at least one of $C_{p4}<C_{p6}$, $C_{e4}<C_{e6}$, and $C_{n4}<C_{n6}$ is satisfied,
where $C_{p6}$ denotes a binder concentration in the sixth positive electrode layer, $C_{e6}$ denotes a binder concentration in the sixth solid electrolyte layer, and $C_{n6}$ denotes a binder concentration in the sixth negative electrode layer, wherein the first side of the collector layer is in contact with the first negative electrode layer, the second negative electrode layer, and the third negative electrode layer, the second side of the collector layer is in contact with the fourth positive electrode layer, the fifth positive electrode layer, and the sixth positive electrode layer, and the third portion, the collector layer, and the sixth portion are bent in the same direction.

16. The battery according to claim 15, wherein the third portion, the collector layer, and the sixth portion are bent toward a side on which the first portion lies, and the third portion has a smaller width than a width of the sixth portion.

17. The battery according to claim 15, wherein the third portion, the collector layer, and the sixth portion are bent toward a side on which the fourth portion lies, and the sixth portion has a smaller width than a width of the third portion.

\* \* \* \* \*